United States Patent
Shinohara et al.

(10) Patent No.: US 7,707,199 B2
(45) Date of Patent: *Apr. 27, 2010

(54) METHOD AND SYSTEM FOR INTEGRATED MANAGEMENT COMPUTER SETTING ACCESS RIGHTS, CALCULATES REQUESTED STORAGE CAPACITY OF MULTIPLE LOGICAL STORAGE APPARATUS FOR MIGRATION

(75) Inventors: Daisuke Shinohara, Yokohama (JP); Yuichi Yagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 370 days.

This patent is subject to a terminal disclaimer.

(21) Appl. No.: 11/616,081

(22) Filed: Dec. 26, 2006

(65) Prior Publication Data
US 2008/0109442 A1 May 8, 2008

(30) Foreign Application Priority Data
Nov. 7, 2006 (JP) .............................. 2006-301262

(51) Int. Cl.
*G06F 17/30* (2006.01)
(52) U.S. Cl. .................. 707/705; 707/781; 707/783
(58) Field of Classification Search .................. 707/1–2, 707/9–10, 100, 102, 103 R–103 X, 200–206, 707/705, 781–783; 711/6, 112, 154, 165, 711/170, 163–164, 150; 718/104–105; 709/203, 709/218–222; 714/13
See application file for complete search history.

(56) References Cited

U.S. PATENT DOCUMENTS

| | | | |
|---|---|---|---|
| 6,260,120 B1 * | 7/2001 | Blumenau et al. | 711/152 |
| 6,636,981 B1 * | 10/2003 | Barnett et al. | 714/4 |
| 6,766,430 B2 * | 7/2004 | Arakawa et al. | 711/165 |
| 7,171,514 B2 * | 1/2007 | Coronado et al. | 711/112 |
| 7,318,133 B2 * | 1/2008 | Yagawa et al. | 711/162 |
| 7,363,535 B2 * | 4/2008 | Taguchi | 714/13 |

(Continued)

FOREIGN PATENT DOCUMENTS

JP 2002-063063 2/2002

(Continued)

OTHER PUBLICATIONS

Nava Aizikowitz et al. "Component-Based Performance Modeling of a Storage Area Network", Proceedings of the 2005 Winter Simulation Conference, 2005, pp. 2417-2426.*

(Continued)

*Primary Examiner*—Srirama Channavajjala
(74) *Attorney, Agent, or Firm*—Brundidge & Stanger, P.C.

(57) ABSTRACT

Exercising integral management of storage apparatuses even when SANs are integrated or when the scale of a SAN expands. In response to an operation request from a management terminal, an integrated management computer collects the management information for storage apparatuses from management computers; selects, based on the collected management information, one or more management computers, to which the task of performing the requested operation is to be assigned; provides the selected management computer(s) with the ability to manage the storage apparatuses which are the management target for the management computer(s); collects pieces of process information from the management computer(s) with the management ability; and integrates and manages the collected pieces of process information.

15 Claims, 21 Drawing Sheets

U.S. PATENT DOCUMENTS

| | | | |
|---|---|---|---|
| 7,366,867 B2 * | 4/2008 | Abe et al. | 711/171 |
| 7,464,070 B2 * | 12/2008 | Yagawa | 707/2 |
| 7,464,124 B2 * | 12/2008 | McBride et al. | 707/204 |
| 7,506,040 B1 * | 3/2009 | Rabe et al. | 709/223 |
| 2001/0054093 A1 | 12/2001 | Iwatani | |
| 2002/0029319 A1 * | 3/2002 | Robbins et al. | 711/114 |
| 2003/0145167 A1 * | 7/2003 | Tomita | 711/114 |
| 2003/0154267 A1 * | 8/2003 | Camacho et al. | 709/223 |
| 2003/0204583 A1 | 10/2003 | Kaneda et al. | |
| 2003/0221063 A1 * | 11/2003 | Eguchi et al. | 711/114 |
| 2003/0236945 A1 * | 12/2003 | Nahum | 711/114 |
| 2004/0085347 A1 * | 5/2004 | Hagarty et al. | 345/735 |
| 2004/0205089 A1 * | 10/2004 | Alon et al. | 707/200 |
| 2005/0086554 A1 * | 4/2005 | Simes | 714/4 |
| 2006/0041656 A1 * | 2/2006 | Li et al. | 709/223 |
| 2007/0079098 A1 * | 4/2007 | Kitamura | 711/170 |

FOREIGN PATENT DOCUMENTS

| | | | |
|---|---|---|---|
| JP | 2003-316607 | | 11/2003 |
| WO | WO 2005/114428 | * | 12/2005 |
| WO | WO 2006053898 | * | 5/2006 |
| WO | WO 2007/096287 | * | 8/2007 |

OTHER PUBLICATIONS

Wilson Yong Hong Wang et al. "Design and development of Ethernet-based storage area network protocol", Computer Communications 29 (2006) 1271-1283.*

Heng Liao, Tech Advisor, "Storage Area Network Architectures", Issue 1: Apr. 2003, PMC Sierra, 36 pages.*

Aameek Singh et al. "Zodiac: Efficient Impact Analysis for Storage Area Networks", Fast '05: 4th USENIX Conference on File and Storage Technologies, pp. 73-86.*

* cited by examiner

| STORAGE AREA ID | CAPACITY | RAID LEVEL | STATUS |
|---|---|---|---|
| 1 | 200 GB | RAID5 | NORMAL |
| 2 | 200 GB | RAID5 | NORMAL |

FIG.8

| LOGICAL STORAGE APPARATUS ID (244-1) | TOP STORAGE AREA ID (244-2) | END STORAGE AREA ID (244-3) | TOTAL CAPACITY (244-4) |
|---|---|---|---|
| 1 | 1 | 100 | 20 TB |
| 2 | 101 | 300 | 40 TB |

FIG.9

| LOGICAL STORAGE APPARATUS ID (245-1) | USER ID (245-2) | AUTHORITY (245-3) |
|---|---|---|
| 1 | USER1 | ALL OPERATIONS |
| 2 | USER2 | READ |

FIG.10

| COPY PAIR ID (246-1) | MAIN STORAGE AREA ID (246-2) | SUB STORAGE AREA ID (246-3) | STATUS (246-4) |
|---|---|---|---|
| 1 | 1 | 11 | PAIR |
| 2 | 101 | 201 | CANCELLED |

FIG.14

| GROUP ID /325-1 | HOST ID /325-2 | /325 |
|---|---|
| GROUP1 | host1.xyz.com |
| GROUP1 | host2.xyz.com |

FIG.15

| APPARATUS ID /326-1 | COPY PAIR ID /326-2 | MAIN STORAGE AREA ID /326-3 | SUB STORAGE AREA ID /326-4 | STATUS /326-5 /326 |
|---|---|---|---|---|
| M1:S1:1 | 1 | 1 | 11 | PAIR |
| M1:S1:1 | 2 | 101 | 201 | CANCELLED |

FIG.16

| APPARATUS ID (424-1) | MANAGEMENT COMPUTER ADDRESS (424-2) |
|---|---|
| M1:S1:1 | 10.2.1.1 |
| M1:S2:2 | 10.2.1.2 |

FIG.17

| APPARATUS ID (425-1) | TOP STORAGE AREA ID (425-2) | END STORAGE AREA ID (425-3) |
|---|---|---|
| M1:S1:1 | 1 | 100 |
| M1:S2:2 | 101 | 300 |

FIG.18

| HOST ID (426-1) | MANAGEMENT COMPUTER ADDRESS (426-2) |
|---|---|
| host1.xyz.com | 10.2.1.1 |
| host2.xyz.com | 10.2.1.1 |

FIG.19

| GROUP ID | MANAGEMENT COMPUTER ADDRESS |
|---|---|
| GROUP1 | 10.2.1.1 |
| GROUP2 | 10.2.1.1 |

| MAIN STORAGE AREA ID | | SUB STORAGE AREA ID | | MANAGEMENT COMPUTER ADDRESS |
|---|---|---|---|---|
| (A) APPARATUS ID | (B) STORAGE AREA ID | (A) APPARATUS ID | (B) STORAGE AREA ID | |
| M1:S1:1 | 1 | M1:S1:1 | 11 | 10.2.1.1 |
| M1:S1:1 | 101 | M1:S1:1 | 201 | 10.2.1.1 |

428-1, 428-2, 428-3, 428

METHOD AND SYSTEM FOR INTEGRATED MANAGEMENT COMPUTER SETTING ACCESS RIGHTS, CALCULATES REQUESTED STORAGE CAPACITY OF MULTIPLE LOGICAL STORAGE APPARATUS FOR MIGRATION

CROSS-REFERENCE TO RELATED APPLICATIONS

This application relates to and claims priority from Japanese Patent Application No. 2006-301262, filed on Nov. 7, 2006, the entire disclosure of which is incorporated herein by reference.

BACKGROUND

1. Field of the Invention

This invention relates to a technique for managing a plurality of storage apparatuses connected to one another via a network, and particularly relates to a technique for managing storage apparatuses in an environment where the number of storage apparatuses and the number of storage areas—management targets—increase.

2. Description of Related Art

With the increase in demand for efficient data management in computer systems, networks called storage area networks (SANs) have become widespread. With a SAN, storage apparatuses and host computers are connected to each other via equipment such as a switch; and the host computers on a network use the storage areas provided by these storage apparatuses. This system involves a series of management operations: creating storage areas the host computers require in appropriate storage apparatuses; and making settings so that the storage areas can be accessed by their allocated destination host computers. Because complicated management is required when performing management operations separately for each storage apparatus, developments have been made for a technique where, as described in Japanese Patent Laid-Open Publication No. 2002-63063, one management computer is provided in a SAN so that it centrally manages the storage apparatuses and decreases the management load.

With conventional storage apparatus management methods, even after a plurality of SANs managed by separate management computers are integrated into one SAN, the respective management computers still remain isolated, so they cannot perform management operations suitable for the post-integration SAN structure, such as the allocation of a storage area in a storage apparatus that belonged to one SAN to a host computer that belonged to another SAN. Also, although the amount of management information dramatically increases with the increase in the number of management target storage apparatuses and storage areas, with the conventional storage apparatus management methods, the amount of manageable management information is limited by the volume of resources or the sizes of memories in the management computer.

Accordingly, it is an object of this invention to execute integral management for storage apparatuses even when communication networks are integrated or when the scale of a communication network expands.

SUMMARY

According to this invention, in order to execute management according to the structure of a communication network, an integrated management computer that selects any of a plurality of management computers in response to a request is provided. To be precise, the integrated management computer collects the management information for storage apparatuses from management computers; selects, based on the collected management information, one or more management computers, to which the task of performing the requested operation is to be assigned; provides the selected management computer(s) with the ability to manage the storage apparatuses that are the management target(s) for the management computer(s); collects pieces of process information from the management computer(s) with the management ability; and integrates and manages the collected pieces of process information.

Moreover, because the management information is migrated between the management computers, the amount of management information a single management computer holds is optimized and the storage apparatuses can be integrally managed even when the scale of the communication network expands.

According to this invention, storage apparatuses can be integrally managed even when communication networks are integrated or when the scale of a communication network expands.

BRIEF DESCRIPTION OF THE DRAWINGS

FIG. 8 is a diagram showing an example of a logical storage apparatus information table stored in the memory in the storage apparatus according to Embodiment 1.

FIG. 9 is a diagram showing an example of an authentication information table stored in the memory in the storage apparatus according to Embodiment 1.

FIG. 10 is a diagram showing an example of a copy pair information table stored in the memory in the storage apparatus according to Embodiment 1.

FIG. 14 is a diagram showing an example of a group information table stored in the memory in the management computer according to Embodiment 1.

FIG. 15 is a diagram showing an example of a copy pair information table stored in the memory in the management computer according to Embodiment 1.

FIG. 16 is a diagram showing an example of a logical storage apparatus/management computer association information table stored in the memory in the integrated management computer according to Embodiment 1.

FIG. 17 is a diagram showing an example of a logical storage apparatus/storage area association information table stored in the memory in the integrated management computer according to Embodiment 1.

FIG. 18 is a diagram showing an example of a host computer/management computer association information table stored in the memory in the integrated management computer according to Embodiment 1.

FIG. 19 is a diagram showing an example of a group/management computer association information table stored in the memory in the integrated management computer according to Embodiment 1.

FIG. 20 is a diagram showing an example of a copy pair/management computer association information table stored in the memory in the integrated management computer according to Embodiment 1.

DETAILED DESCRIPTION OF PREFERRED EMBODIMENTS

Embodiment 1

In order to connect a plurality of storage apparatuses and host computers to one another via equipment such as a switch so that the host computers can use, via a SAN, the storage areas provided by the storage apparatuses, a series of management operations—creating storage areas the host computers require in appropriate storage apparatuses and making settings so that the storage areas can be accessed by their allocated destination host computers respectively—is necessary.

Here, complicated management is required if performing management operations separately for each storage apparatus. Meanwhile, if one management computer is arranged in the SAN, it centrally manages the storage apparatuses and decreases management loads.

However, with the increase in the number of resources such as storage areas provided by a single storage apparatus, or the increase in the number of management target storage apparatuses, it has become difficult for a single management computer to keep the management information for all the storage apparatuses and execute management such as information acquisition, storage area creation, and allocation of storage areas to the host computers.

In Embodiment 1, a method for cooperatively managing all the storage apparatuses using a plurality of management computers is provided.

Figure 1:
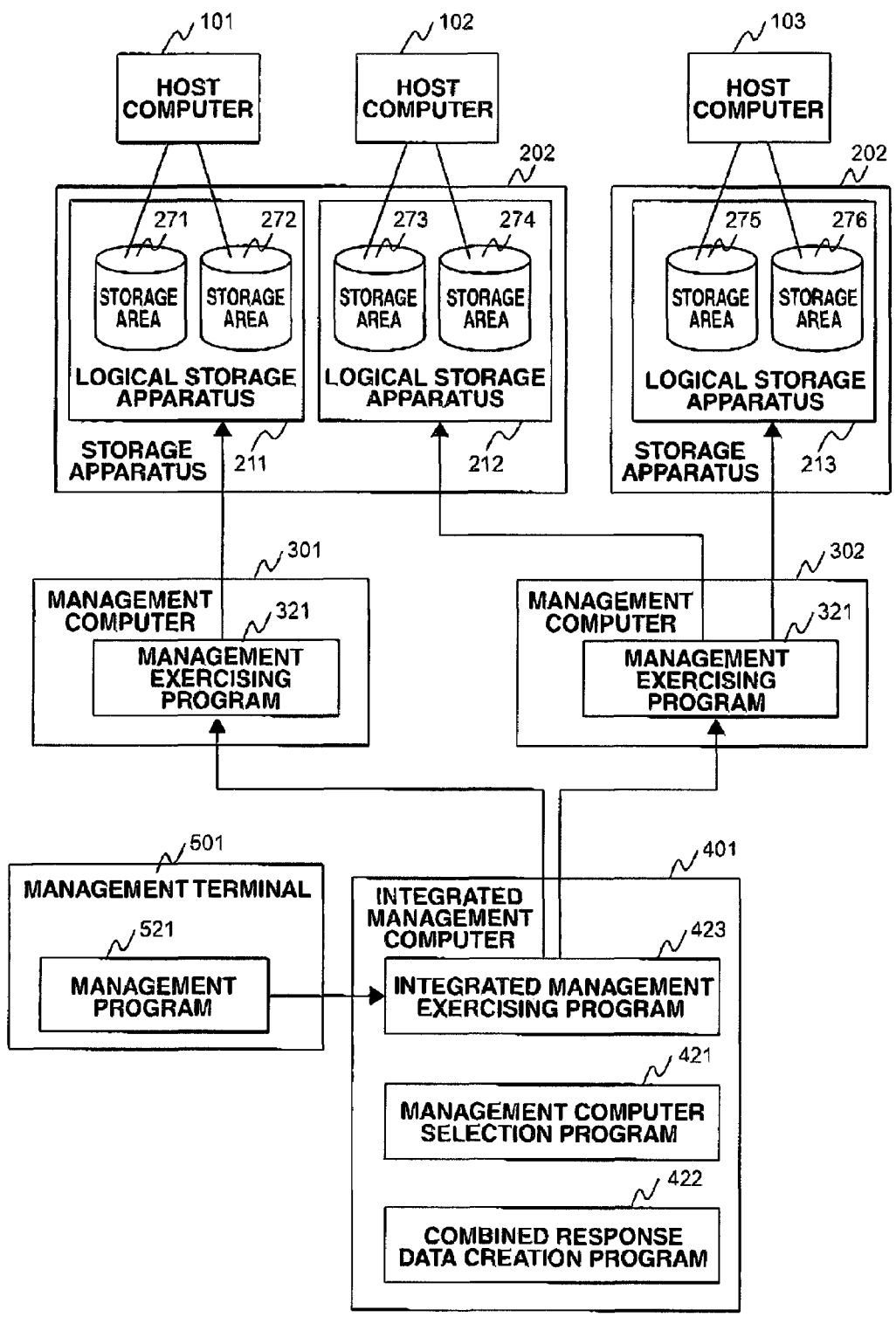
FIG. 1 is a diagram showing the overview of a system structure according to Embodiment 1 of this invention.

An overview of Embodiment 1 of this invention is explained with reference to the drawings. FIG. 1 is a diagram showing the overview of a system structure according to Embodiment 1.

Reference numerals 101, 102 and 103 indicate host computers, and reference numerals 201 and 202 indicate storage apparatuses. In Embodiment 1, the host computers 101 and 102 are connected to the storage apparatus 201 and the host computer 103 is connected to the storage apparatus 202. Two storage areas (271 and 272, 273 and 274, and 275 and 276) are allocated to each host computer.

Reference numerals 211, 212 and 213 indicate logical storage apparatuses, each including one or more storage areas and being handled as an independent storage apparatus. If a storage apparatus does not include two or more logical storage apparatuses, that storage apparatus may be regarded as a logical storage apparatus.

Reference numerals 301 and 302 indicate management computers. A management target for each management computer (301, 302) is one or more logical storage apparatuses 211-213. In Embodiment 1, the management target for the management computer 301 is the logical storage apparatus 211 in the storage apparatus 201; and the management targets for the management computer 302 are both the logical storage apparatus 212 in the storage apparatus 201 and the logical storage apparatus 213 in the storage apparatus 202.

Here, the term "management target" refers to a target for which the management such as information acquisition, storage area creation, and allocation of storage areas to the host computers 101-103, is executed using the management computers 301 and 302. That is, the management computer 301 manages the logical storage apparatus 211 and the management computer 302 manages the logical storage apparatuses 212 and 213.

Each management computer 301, 302 obtains and stores configuration information including the storage area information for its management target logical storage apparatus 211-213.

Reference numeral 401 indicates an integrated management computer. The integrated management computer 401 manages logical storage apparatuses using one or more management computers. In Embodiment 1, it manages the logical storage apparatuses 211-213 using the management computers 301 and 302.

Reference numeral 501 indicates a management terminal. The management terminal 501 provides a user interface for the users to use to execute management such as information acquisition, storage area creation, and the allocation of storage areas to the host computers. The user interface provided by the management terminal 501 may be based on the input/output of characters or they may be graphical interfaces requiring input devices such as a mouse.

The integrated management computer 401 is connected to the management terminal 501 so that it executes the management requested by the management terminal 501. When exercising the management, the integrated management computer 401 determines, based on a management computer selection program 421 and depending on the content of a request; which management computer 301 or 302 can perform that task selects a management computer 301 or 302; and assigns the task to it. Moreover, based on a combined response data creation program 422, it combines reply data sent from the management computer 301 with that from the management computer 302 and sends it to the management terminal 501. The integrated management computer 401 does not hold the configuration information including the storage area information for its management target logical storage apparatuses 211-213 in itself but uses the information stored in the management computers 301 and 302 whose management targets are the logical storage apparatuses 211-213 in order to manage the logical storage apparatuses 211-213).

Accordingly, even when the number of resources, such as the storage areas, provided by a single storage apparatus 201 or 202 increases or when the number of management target storage apparatuses increases, the integrated management computer 401 can execute the management of all the storage apparatuses 201 and 202.

Figure 2:
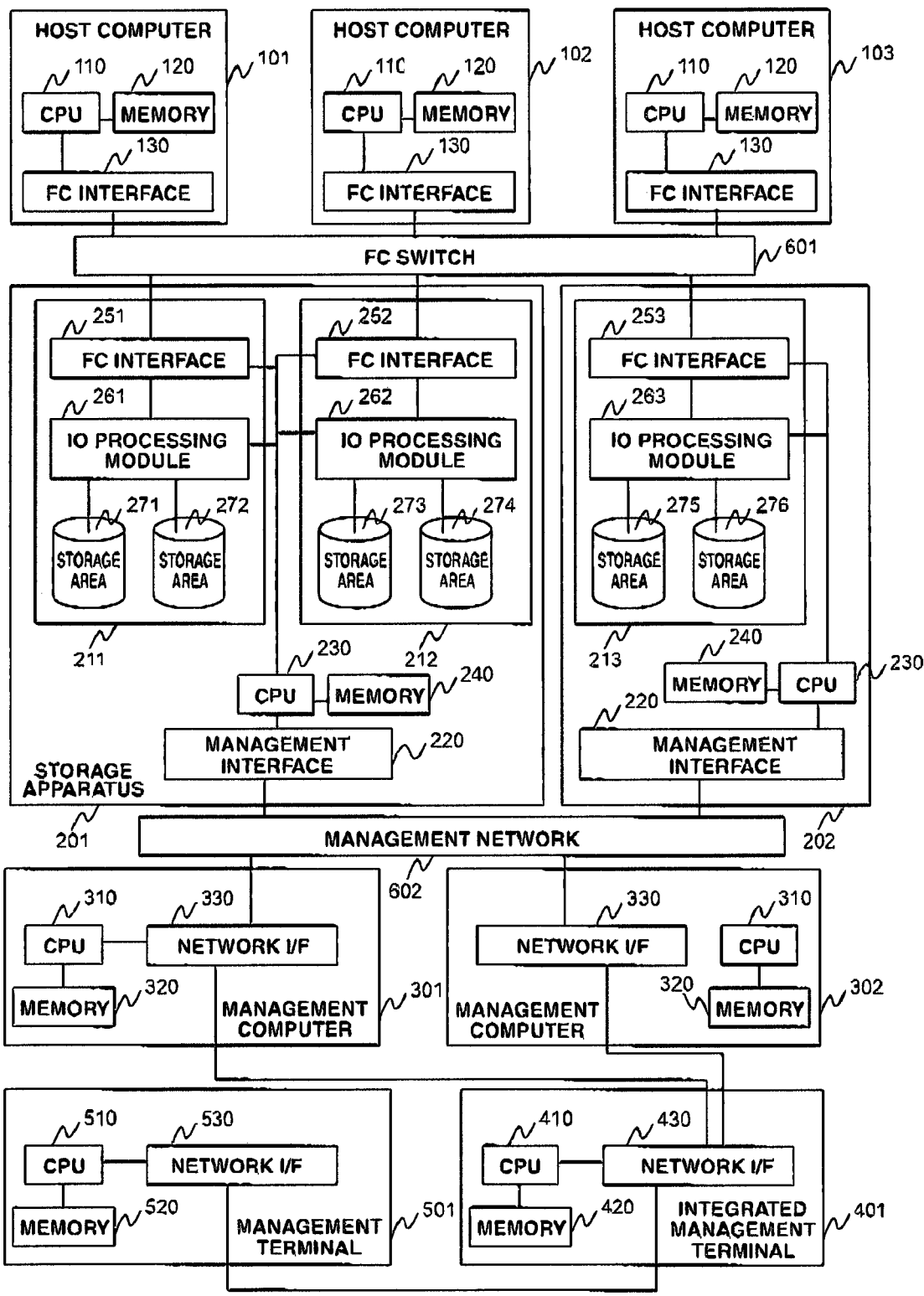
FIG. 2 is another diagram showing the system structure according to Embodiment 1.

Details of Embodiment 1 are explained with reference to the drawings. FIG. 2 is another diagram showing the system structure according to Embodiment 1. In FIG. 2, reference numerals 101, 102 and 103 indicate host computers; reference numerals 201 and 201 indicate storage apparatuses; reference numerals 301 and 302 indicate management computers; reference numeral 401 indicates an integrated management computer; reference numeral 501 indicates a management terminal; reference numeral 601 indicates a Fibre Channel switch (FC switch); and reference numeral 602 indicates a management network.

Each host computer 101-103 includes; a CPU 110, memory 120 for storing programs run by the CPU 110 and data read/written from/to the storage apparatuses 201 and 202; and a Fibre Channel interface (FC interface) 130 for controlling the transmission of data based on Fibre Channel protocol. The host computers 101-103 are connected to the FC switch 601 via their own FC interfaces 130. The host computers 101 and 102 are connected, via this FC switch 601 to the storage apparatus 201 while the host computer 103 is connected, via the FC switch 601 to the storage apparatus 202

The storage apparatus 201 includes, a management interface 220 for receiving management requests a CPU 230; memory 240 for storing programs run by the CPU 230 and the data used by the programs; and two logical storage apparatuses 211 and 212. The logical storage apparatus 211 has; an FC interface 251 for connection with the FC switch 601; an IO processing module 261 for processing 10 requests from the host computer 101; and storage areas 271 and 272 used by the host computer 101. Likewise, the logical storage apparatus 212 has an FC interface 252 for the connection with the FC switch 601; an IO processing module 262 for processing IO requests from the host computer 102; and storage areas 273 and 274 used by the host computer 102.

The storage areas 271 and 272 are connected, via the FC interface 251, to the FC switch 601 and further connected to the host computer 101 via this FC switch 601. Accordingly, the host computer 101 uses the storage areas 271 and 271, i.e., writes/reads data to/from them.

Likewise, the storage areas 273 and 274 are connected, via the FC interface 252, to the FC switch 601 and further connected to the host computer 102 via this FC switch 601. Accordingly, the host computer 102 uses the storage areas 273 and 274, i.e., write/reads data to/from them.

The storage apparatus 201 is connected, via its management interface 220, to the management network 602 and further connected, via this management network 602, to the management computer 301.

The storage apparatus 202 includes: a management interface 220 for receiving management requests; a CPU 230; memory 240 for storing programs run by the CPU 230 and the data used by the programs; and logical storage apparatus 213. The logical storage apparatus 213 has; an FC interface 253 for connection with the FC switch 601; an IO processing module 263 for processing IO requests from the host computer 103; and storage areas 275 and 276 used by the host computer 103.

The storage areas 275 and 276 are connected, via the FC interface 253, to the FC switch 601 and further connected to the host computer 103 via the FC switch 601. Accordingly, the host computer 103 uses the storage areas 275 and 276, i.e., writes/reads data to/from them. The storage apparatus 202, is connected, via its management interface 220, to the management network 602. It is also connected, via the management network 602, to the management computers 301 and 302.

Each management computer 301, 302 includes: a CPU 310; memory 320 for storing programs run by the CPU 310 and the data used by the programs; and a network interface (network I/F) 330 such as LAN adapter. The management computer 301 is connected, via its own network I/F 330, to the management network 602 and the integrated management computer 401. It is also connected, via the management network 602, to the storage apparatus 201. The management computer 302 is connected, via its own network I/F 330, to the management network 602 and the integrated management computer 401. It is also connected, via the management network 602, to the storage apparatuses 201 and 202.

The integrated management computer 401 includes: a CPU 410; memory 420 for storing programs run by the CPU 410 and the data used by the programs; and a network interface (network I/F) 430 such as a LAN adapter. The integrated management computer 401 is connected, via its own network I/F 430, to the management computers 301 and 302 as well as the management terminal 501.

The management terminal 501 includes: a CPU 510; memory 520 for storing programs run by the CPU 510 and the data used by the programs; and a network interface (network I/F) 530 such as a LAN adapter. The management terminal 501 is connected, via its own network I/F 530, to the integrated management computer 401.

Figure 3:
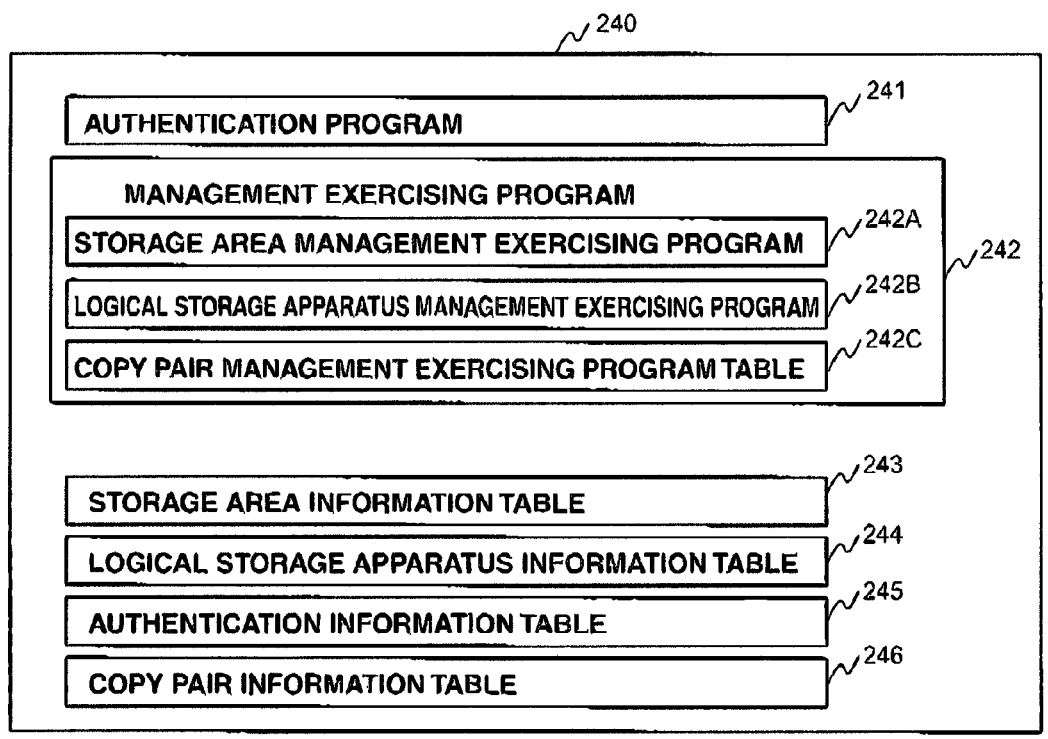
FIG. 3 is a diagram showing an example of programs and data stored in memory in a storage apparatus according to Embodiment 1.

FIG. 3 shows an example of the programs and data stored in the memory 240 in each storage apparatus (201, 202) according to Embodiment 1. Each storage apparatus (201, 202) stores in its memory 240: an authentication program 241 for verifying management authority to manage the logical storage apparatuses (211-213) in the storage apparatus; a management program 242 for managing the storage apparatus; a storage area information table 243 including the data for the storage areas (271-276) in the storage apparatus; a logical storage apparatus information table 244 including the data for the logical storage apparatus (211-213) in the storage apparatus; an authentication information table 245 including the data for management authority to manage the logical storage apparatus (211-213) in the storage apparatus; and a copy pair information table 246 including the data for copy pairs in the storage apparatus. The management program 242 includes a storage area management program 242A for managing) the storage areas (271-276) in the storage apparatus; a logical storage apparatus management program 242B for managing the logical storage apparatuses (211-213) in the storage apparatus; and a copy pair management program 242C for managing the copy pairs in the storage apparatus.

The authentication program 241 and management program 242 (including the storage area management program 242A, logical storage apparatus management program 242B, copy pair management program 242C) are stored on a non-volatile recording medium (such as a magnetic disk) in the storage apparatus (201, 202) and loaded into the memory 240 and run by the CPU 230 when the storage apparatus (201, 202) is activated. These programs may alternatively be stored on a recording medium (e.g., non-volatile memory, a CD-ROM, or a floppy (registered trademark) disk) other than a magnetic disk. These programs are loaded from the recording medium into the storage apparatus (201, 202) or they may be accessed via the network and loaded into the storage apparatus (201, 202).

Figure 4:
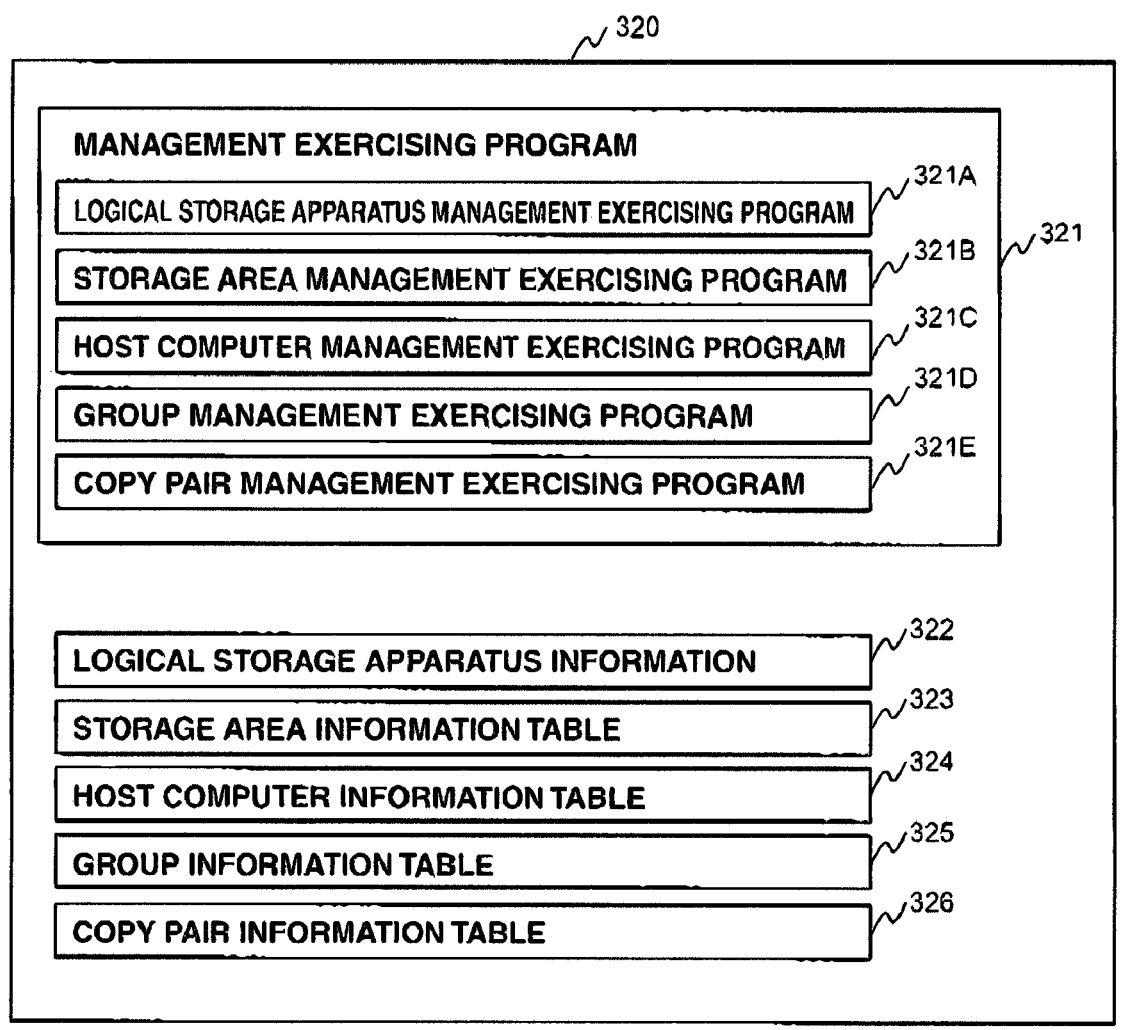
FIG. 4 is a diagram showing an example of programs and data stored in memory in a management computer according to Embodiment 1.

FIG. 4 shows an example of the programs and data stored in the memory 320 in each management computer (301, 302) according to Embodiment 1. Each management computer (301, 302) stores in its memory 320: a management program 321 for managing its management target storage apparatus (es) (201, 202); a logical storage apparatus information table 322 including the data for the logical storage apparatuses (211-213) which are the management targets for the management computer; a storage area information table 323 including the data for the storage areas (271-276) in the logical storage apparatuses (211-213), that are the management targets for the management computer; a host computer information table 324 including the data for the host computers (101-103) that are the management targets for the management computer, a group information table 325 including the data for the groups that are the management targets for the management computer; and a copy pair information table 326 including the data for copy pairs in the logical storage apparatuses (211-213), that are the management targets for the management computer (301, 302). The management program 321 further includes: a logical storage apparatus management program 321A for managing the logical storage apparatuses (211-213) that are the management targets for the management computer; a storage area management program 321B for managing the storage areas (271-276) in the logical storage apparatuses (211-213), that are the management targets for the management computer; a host computer management program 321C for managing the host computers (101-103) that are the management targets for the management computer; a group management program 321D for managing the groups that are the management targets for the management computer; and a copy pair management program 321E for managing the copy pairs in the logical storage apparatuses (211-213), that are the management targets for the management computer.

The host computer information table 324 stores the management-information for the relationships between the host computers 101-103 and the storage areas allocated thereto. In Embodiment 1, the host computer information table 324 is not stored in the storage apparatus 201 or 202; however, if the storage apparatuses 201 and 202 are capable of having the information for the host computers 101-103 to which their storage areas are allocated, the host computer information table 324 may be stored in the storage apparatus 201 and 202. If the storage apparatuses 201 and 202 have, for example, a masking function for setting access right for the host computers 101-103 to access storage areas, they may store the host computer information table 324.

In Embodiment 1, the host computer information table 324 shows the relationships between the host computers 101-103 and the storage areas allocated thereto by the zoning feature of the FC switch and the masking feature of the storage apparatuses 201 and 202. The group information table 325 according to Embodiment 1 is used, as will be described later, for grouping the host computers 101-103 and so it is isolated from the internal information for the storage apparatuses 201 and 202. The host computer management program 321C and the group management program 321D according to Embodiment 1 are not intended for managing the storage apparatuses but for managing the host computers 101-103 or groups in order to allocate storage areas to the host computers 101-103 efficiently.

The management program 321 (including the logical storage apparatus management program 321A, storage area management program 321B, host computer management program 321C, group management program 321D, and copy pair management program 321E) is stored on a non-volatile recording medium (such as a magnetic disk) in the management computer (301, 302) and loaded into the memory 320 and run by the CPU 310 when the management computer is activated. These programs may alternatively be stored on a recording medium a (e.g., non-volatile memory, a CD-ROM, or a floppy (registered trademark) disk) other than a magnetic disk. These programs are loaded from the recording medium into the management computer or they may be accessed via the network and loaded into the management computer.

Figure 5:
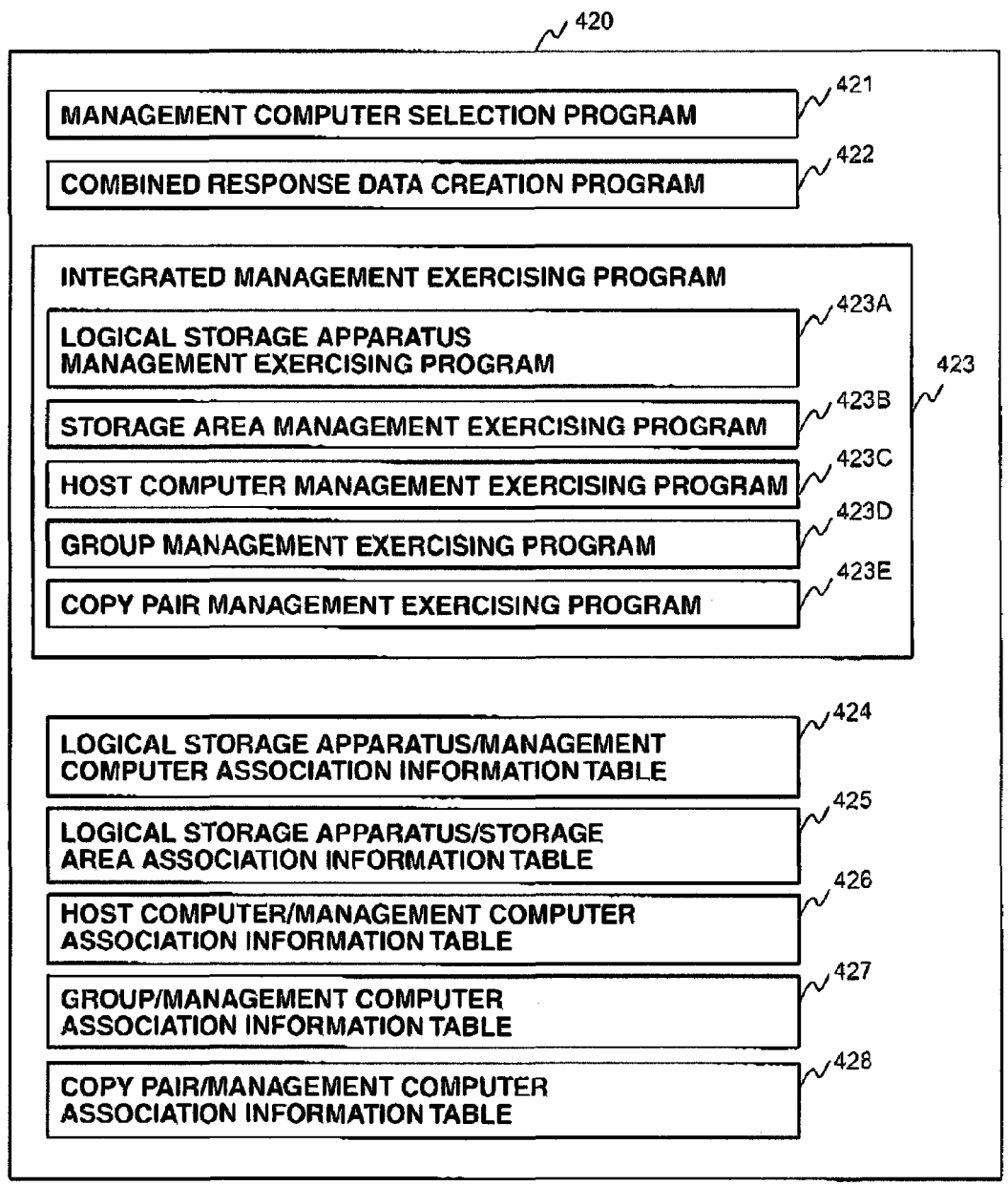
FIG. 5 is a diagram showing an example of programs and data stored in memory in an integrated management computer according to Embodiment 1.

FIG. 5 shows an example of the programs and data stored in the memory 420 in the integrated management computer 401 according to Embodiment 1. The integrated management computer 401 stores in its memory 420; a management computer selection program 421 for selecting a management computer 301 or 302 which is to manage a designated resource; a combined response data creation program 422 for combining response data from one or more management computers (301, 302) as a single unit of response data; an integrated management program 423 for managing the logical storage apparatuses 211-213 which are the management targets for the integrated management computer 401; a logical storage apparatus/management computer association information table 424 including the data for the relationships between the logical storage apparatuses 211-213 and the management computers 301 and 302 whose management targets are the logical storage apparatuses 211-213; a logical storage apparatus/storage area association information table 425 including the data for the relationships between the logical storage apparatuses 211-213 and the storage areas in the logical storage apparatuses 211-213; a host computer/management computer association information table 426 including the data for the relationships between the host computers 101-103 and the management computers 301 and 302 whose management targets are the host computers 101-103; a group/management computer association information table 427 including the data for the relationships between the groups and the management computers 301 and 302 whose management targets are those groups; and a copy pair/management computer association information table 428 including the data for the relationships between the copy pairs and the management computers 301 and 302 whose management targets are those copy pairs. The integrated management program 423 further stores: a logical storage apparatus management program 423A for managing the logical storage apparatuses 211-213 that are the management targets for the integrated management computer 401; a storage area management program 423B for managing the storage areas in the logical storage apparatuses 211-213, that are the management targets for the integrated management computer 401; a host computer management program 423C for managing the host computers 101-103 that are the management targets for the integrated management computer 401; a group management program 423D for managing the groups that are the management targets for the integrated management computer 401; and a copy pair management program 423E for managing the copy pairs in the storage apparatuses 201 and 202, that are the management targets for the integrated management computer 401.

The management computer selection program 421 is stored as one of the elements of a management computer selection unit, the combine and response data creation program 422 is stored as one of the elements of an integrated management unit, and the integrated management program 423 (including the logical storage apparatus management program 423A, storage area management program 423B, host computer management program 423C, group management program 423D, and copy pair management program 423E) is stored as one of the elements of an integrated management unit, on a non-volatile recording medium (such as a magnetic disk) in the integrated management computer 401 and loaded into the memory 420 and run by the CPU 410 when the integrated management computer 401 is activated. These programs may alternatively be stored on a recording medium (e.g., non-volatile memory, a CD-ROM, or a floppy (registered trademark) disk) other than a magnetic disk. These programs are loaded from the recording medium into the integrated management computer 401 or they may be accessed via the network and loaded into the integrated management computer 401.

Figures 6, 7:
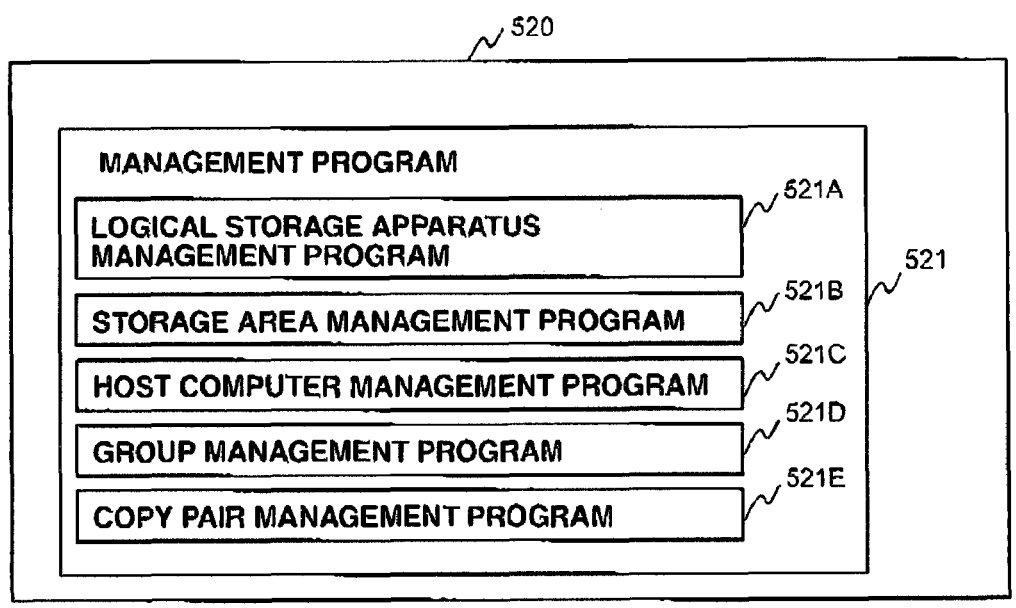
FIG. 6 is a diagram showing an example of programs and data stored in memory in a management terminal according to Embodiment 1.
FIG. 7 is a diagram showing an example of a storage area information table stored in the memory in the storage apparatus according to Embodiment 1.

FIG. 6 shows an example of the programs and data stored in the memory 520 in the management terminal 501 according to Embodiment 1. The management terminal 501 stores in its memory 520 a management program 521 for providing a user interface used for managing the storage apparatuses 201 and 202. This management program 521 stores: a logical storage apparatus management program 521A for requesting the acquisition of the information for and the setting of the logical storage apparatuses 211-213; a storage area management program 521B for requesting the acquisition of the information for and the setting of the storage areas; a host computer management program 521C for requesting the acquisition of the information for and the setting of the host computers 101-103; a group management program 521D for requesting the acquisition of the information for and the setting of the groups; and a copy pair management program 521E for requesting the acquisition of the information for and the setting of the copy pairs.

The management program 521 (including the logical storage apparatus management program 521A, storage area management program 521B, host computer management program 521C, group management program 521D, and copy pair management program 521E) is stored on a non-volatile recording medium (such as a magnetic disk) in the management terminal 501 and loaded into the memory 520 and run by the CPU 510 when the management terminal 501 is activated. These programs may alternatively be stored on a recording medium (e.g., non-volatile memory, a CD-ROM, or a floppy (registered trademark) disk) other than a magnetic disk. These programs are loaded from the recording medium into the management terminal 501 or they may be accessed via the network and loaded into the management terminal 501.

FIG. 7 shows an example of the storage area information table 243 stored in the memory 240 in each storage apparatus (201, 202) according to Embodiment 1. This storage area information table 243 includes, a storage area IDs section 243-1 indicating the identification information for the storage areas in the storage apparatuses 201 and 202; a capacities section 243-2 indicating the sizes of the storage areas; a RAID levels section 243-3 indicating the RAID types of the storage areas; and a statuses section 243-3 indicating whether or not the storage areas have problems.

The example in FIG. 7 shows that two storage areas having IDs 1 and 2, both being structured based on RAID 5 and having the same capacity of 200 GB without any internal problems, belong to one storage apparatus.

In Embodiment 1, the values of only four types of attributes are shown, but the number of attribute types is not limited to four. The storage area information table 243 may include the values of many types of attributes.

FIG. 8 shows an example of the logical storage apparatus information table 244 stored in the memory 240 in each storage apparatus (201, 202) according to Embodiment 1. This logical storage apparatus information table 244 includes: a logical storage apparatus IDs section 244-1 indicating the identification information for the logical storage apparatuses (211-213) in the storage apparatus; a top storage area IDs section 244-2 indicating the IDs of top storage areas from among the storage areas allocated to the logical storage apparatuses (211-213); an end storage area IDs section 244-3 indicating the IDs of end storage areas from among the storage areas allocated to the logical storage apparatuses (211-213); and a total capacities section 244-4 indicating the total sizes of the respective storage areas allocated to the respective logical storage apparatuses (211-213).

In the example shown in FIG. 8, logical storage apparatuses having IDs of 1 and 2 belong to a storage apparatus (201, 202). Storage areas with a total capacity of 20 TB, ranging from the storage area having the ID 1 to the storage area having the ID 100, are allocated to the logical storage apparatus having the ID 1. Likewise, storage areas with a total capacity of 40 TB, ranging from the storage area having the ID 101 to the storage area having the ID 300, are allocated to the logical storage apparatus having the ID 2.

Each logical storage apparatus includes successive storage areas and one storage area does not belong to more than one logical storage apparatus. Accordingly, when a storage area is designated, the logical storage apparatus this storage area belongs to is found by referring to the logical storage apparatus information table 244.

FIG. 9 shows an example of the authentication information table 245 stored in the memory 240 in each storage apparatus (201, 202) according to Embodiment 1. The authentication information 245 includes: a logical storage apparatus IDs section 245-1 indicating the identification information for logical storage apparatuses 211-213 in that storage apparatus; a user IDs section 245-2 indicating the identification information for the users who use the logical storage apparatuses; an authority information section 245-3 indicating the access right of the users specified by/in the IDs section 245-2 to access the logical storage apparatuses specified by/in the IDs section 245-1.

The example in FIG. 9 shows that the user having the ID USER1 is allowed to perform all kinds of operations for the logical storage apparatus having the ID 1, and the user having the ID USER2 is allowed only to read the data from the logical storage apparatus having the ID 2.

Although not shown in FIG. 9, the authentication information table 245 may include the information for passwords associated with the user IDs. Combinations of the user IDs and passwords may be used as the account information for the operating systems to be run.

Although the user IDs are used as the authentication information in Embodiment 1, other identification information such as network addresses may be used instead.

FIG. 10 shows an example of the copy pair information table 246 stored in the memory 240 in each storage apparatus (201, 202) according to Embodiment 1. The copy pair information 246 includes: a copy pair IDs section 246-1 indicating the identification information for copy pairs in the storage apparatus; a main storage area IDs section 246-2 indicating the identification information for the main storage areas in those copy pairs; a storage area IDs section 246-3 indicating the identification information for the sub storage areas used for backup in those copy pairs; and a status information section 246-4 indicating the transition information) for these copy pairs.

The example in FIG. 10 shows that two copy pairs having the IDs of 1 and 2 belong to a storage apparatus (201, 202). The main storage area in the copy pair having the ID 1 is the storage area having the ID 1 and the sub storage area is the one having the ID 11. The copy pair having the ID 1 is in the "paid" state, which means that the data written in the main storage area is correctly written in the sub storage area. The main storage area in the copy pair having the ID 2 is the storage area having the ID 101 and the sub storage area is the one having the ID 201. The copy pair having the ID 2 is in the "split" state which means that their pair relationship has been split.

The main storage areas and sub storage areas in the copy pairs contained in the copy pair information table 246 may belong to the same logical storage apparatus or separate logical storage apparatuses.

Figure 11:
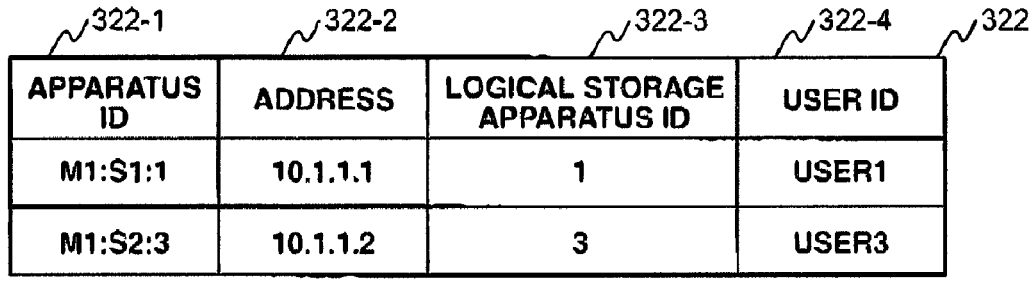
FIG. 11 is a diagram showing an example of a logical storage apparatus information table stored in the memory in the management computer according to Embodiment 1.

FIG. 11 shows an example of the logical storage apparatus information table 322 stored in the memory 320 in each management computer (301, 302) according to Embodiment 1. The logical storage apparatus information table 322 includes: an apparatus IDs section 322-1 indicating the identification information for the logical storage apparatuses 211-213, which are the management targets for the management computer; an address information section 322-2 indicating the addresses designated when connecting the management interfaces of target logical storage apparatuses; a logical storage apparatus IDs section 322-3 indicating the identification information for target logical storage apparatuses, the identification information being shared among the storage apparatuses; and a user IDs section 322-4 indicating the user IDs designated when connecting the management interfaces of target logical storage apparatuses.

The example in FIG. 11 shows that two logical storage apparatuses having the IDs M1:S1:1 and M1:S1:3 are the management targets for a management computer (301, 302). The ID of a logical storage apparatus is made by combining the model name of the storage apparatus the logical storage apparatus belongs to, the serial number of the storage apparatus; and the ID of the logical storage apparatus used in that storage apparatus, using colons. For the logical storage apparatus having the ID "M1:S1:1," the address of its management interface is 10.1.1.1, its ID used in the storage apparatuses 201 and 202 is 1, and the ID of the user accessing the management interface in the logical storage apparatus is USER1. For the logical storage apparatus having the ID "M1:S1:3," the address of its management interface is 10.1.1.2, its ID used in the storage apparatuses 201 and 202 is 3, and the ID of the user accessing the management interface in the logical storage apparatus is USER3.

Although IP addresses are taken as examples of the addresses of the management interfaces in the logical storage apparatuses, other data may be used instead as the management interface addresses as long as it can specify the locations of the management interfaces on the communication paths.

Figure 12:
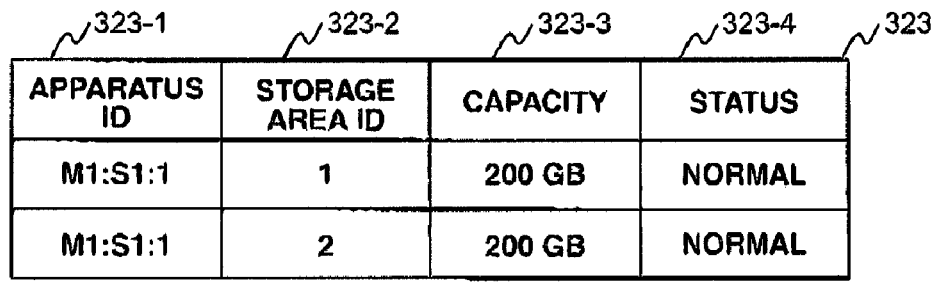
FIG. 12 is a diagram showing an example of a storage area information table stored in the memory in the management computer according to Embodiment 1.

FIG. 12 shows an example of the storage area information table 323 stored in the memory 320 in each management computer (301, 302) according to Embodiment 1. The storage area information table 323 includes: an apparatus IDs section 323-1 indicating the identification information for the logical storage apparatuses 211-213 which are the management targets for the management computer; a storage area IDs section 323-2 indicating the identification information for the storage areas used in target logical storage apparatuses, the identification information being shared among the storage apparatuses; a capacity information section 323-3 indicating the sizes of target storage areas; and a status information section 323-4 indicating the presence/absence of abnormality in the target storage areas.

Although the values of only four types of attributes are shown in Embodiment 1, the number of attribute types is not limited to four and the storage area information table 323 may contain the values of many other attributes.

The example in FIG. 12 shows that two storage areas having the IDs 1 and 2, both belonging to the same logical storage apparatus "M1:S1:1," are the management targets for a management computer (301, 302). Each of the two storage areas has the capacity of 200 GB and its operating status is normal.

Figure 13:
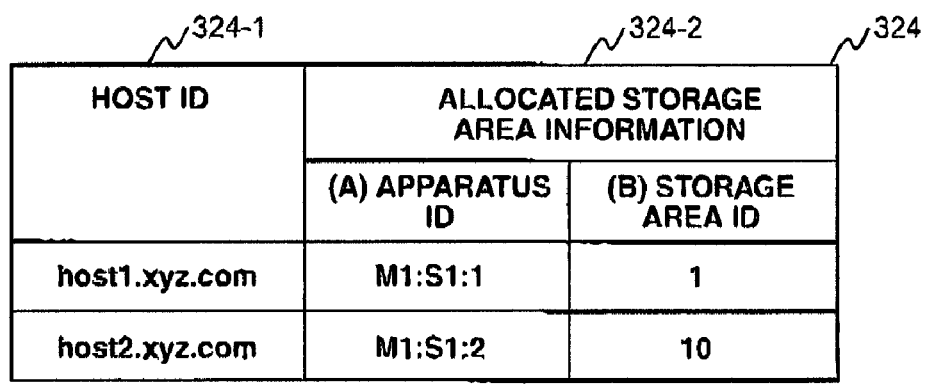
FIG. 13 is a diagram showing an example of a host computer information table stored in the memory in the management computer according to Embodiment 1.

FIG. 13 shows an example of the host computer information table 324 stored in the memory 320 in each management computer (301, 302) according to Embodiment 1. The host computer information table 324 includes a host IDs section 324-1 indicating the identification information for the host computers 101-103 which are the management target(s) for the management computer; and an allocated storage area information section 324-2 indicating the storage areas allocated to the host computers the information section 324-2 being composed of an apparatus IDs section indicating the identification information for the logical storage apparatuses 211-213 which are the management target(s) for the management computer and a storage area IDs section indicating the identification information for the storage areas in target logical storage apparatuses, the identification information being shared among the storage apparatuses.

The example in FIG. 13 shows that two host computers having the IDs of host1.xyz.com and host2.xyz.com are the management targets for a management computer (301, 302). The storage area having the ID 1 belonging to the logical storage apparatus M1:S1:1 is allocated to the host computer host1.xyz.com. Likewise, the storage area having the ID 2 belonging to the logical storage apparatus M1:S1:2 is allocated to the host computer host2.xyz.com.

In Embodiment 1, although the case where storage areas belonging to one logical storage apparatus are allocated to one host computer is shown, storage areas belonging to different logical storage apparatuses may be allocated to one host computer.

FIG. 14 shows an example of the group information table 325 stored in the memory 320 in each management computer (301, 302) according to Embodiment 1. The group information table 325 includes: a group IDs section 325-1 indicating the identification information for the groups which are the management targets for the management computer, and a host IDs section 325-2 indicating the identification information for the host computers belonging to these groups.

The example in FIG. 14 shows that the group having the ID GROUP1 is the management target for the management computer. The host computers having the IDs host1.xyz.com and host2.xyz.com belong to this group.

FIG. 15 shows an example of the copy pair information table 326 stored in the memory 320 in each management computer (301, 302) according to Embodiment 1. The copy pair information table 326 includes: an apparatus IDs section 326-1 indicating the identification information for the logical storage apparatuses 211-213, which are the management target(s) for the management computer; a copy pair IDs section 326-2 indicating the identification information for the copy pairs in the target logical storage apparatuses, this identification information being shared among the storage apparatuses; a main storage area IDs section 326-3 indicating the identification information for the main storage areas in the copy pairs in the target logical storage apparatus, the identification information being shared among the storage apparatuses; a sub storage area IDs section 326-4 indicating the identification information for the sub storage areas in the copy pairs in the target logical storage apparatuses, this identification information being used among the storage apparatuses; and a status data section 326-5 indicating the transition status of the copy pairs.

The example in FIG. 15 shows that the copy pairs having the IDs 1 and 2, both belonging to the same logical storage apparatus M1:S1:1, are the management targets for the management computer (301, 302). The ID of the main storage area in the copy pair 1 is 1 and that of the sub storage area is 11. The copy pair 1 is in the "pair" state. Likewise, the ID of the main storage area in the copy pair 2 is 101 and that of the sub storage area is 201. The copy pair 2 is in the "split" state.

FIG. 16 shows an example of the logical storage apparatus/management computer association information table 424 stored in the memory 420 stored in the integrated management computer 401 according to Embodiment 1.

The logical storage apparatus/management computer association information table 424 includes; an apparatus IDs section 424-1 indicating the identification information for the logical storage apparatuses 211-213, which are the management targets for the integrated management computer 401; and a management computer addresses section 424-2 indicating the address information for the management computers 301 and 302 that manage the logical storage apparatuses.

The example in FIG. 16 shows that two logical storage apparatuses having the IDs M1:S1:1 and M1:S2:2 are the management targets for the integrated management computer 401. The address of the management computer managing the logical storage apparatus M1:S1:1 is 10.2.1.1. The address of the management computer managing the logical storage apparatus M1:S1:2 is 10.2.1.2.

FIG. 17 shows an example of the logical storage apparatus/storage area association information table 425 stored in the memory 420 in the integrated management computer 401 according to Embodiment 1. The logical storage apparatus/storage area association information table 425 includes: an apparatus IDs section 425-1 indicating the identification information for the logical storage apparatuses 211-213 which are the management targets for the integrated management computer 401; a top storage area IDs section 425-2 indicating the IDs of the top storage areas from among the storage areas allocated to the logical storage apparatuses, and an end storage area IDs section 425-3 indicating the IDs of the end storage areas from among the storage areas allocated to the logical storage apparatuses.

The example in FIG. 17 shows that two logical storage apparatuses having the IDs M1:S1:1 and M1:S2:2 are the management targets for the integrated management computer 401. Storage areas having the IDs 1 to 100 are allocated to the logical storage apparatus M1:S1:1. Likewise, the storage areas having the IDs 101 to 300 are allocated to the logical storage apparatus M1:S2:2.

FIG. 18 shows an example of the host computer/management computer association information table 426 stored in the memory 420 in the integrated management computer 401 according to Embodiment 1. The host computer/management computer association information table 426 includes: a host IDs section 426-1 indicating the identification information for the host computers 101-103, which are the management targets for the integrated management computer 401; and a management computer addresses section 426-2 indicating the address information for the management computers 301 and 302 managing the host computers 101-103.

The example in FIG. 18 shows that two host computers having the IDs host1.xyz.com and host2.xyz.com are the management targets for the integrated management computer 401. The address of the management computer managing the host computer host1.xzy.com is 10.2.1.1. Likewise, the address of the management computer managing the host computer host2.xyz.com is 10.2.1.1.

FIG. 19 shows an example of the group/management computer association information table 427 stored in the memory 420 in the integrated management computer 401 according to Embodiment 1. The group/management computer association information table 427 includes: a group IDs section 427-1 indicating the identification information for the groups that are the management targets for the integrated management computer 401; and a management computer addresses section 427-2 indicating the address information for the management computers 301 and 302 managing these groups.

The example in FIG. 19 shows that two groups having the IDs GROUP1 and GROUP2 are the management targets of the integrated management computer 401. The address of the management computer managing the management of the group GROUP1 is 10.2.1.1. Likewise, the address of the management computer managing the group GROUP2 is 10.2.1.1.

FIG. 20 shows an example of the copy pair/management computer association information table 428 stored in the memory 420 in the integrated management computer 401 according to Embodiment 1. The copy pair/management computer association information table 428 includes: a main storage area IDs section 428-1 composed of an apparatus IDs section indicating the identification information for the logical storage apparatuses 211-213, which are the management targets for the integrated management computer 401 and a storage area IDs section indicating the identification information for the main storage apparatuses in the copy pairs in the target logical storage apparatus; a sub storage area IDs section 428-2 composed of an apparatus IDs section indicating the identification information for the logical storage apparatuses 211-213 which are the management targets for the integrated management computer 401 and a storage area IDs section indicating the identification information for the sub storage areas in the copy pairs in the target logical storage apparatus; and a management computer addresses section 428-3 indicating the address information for the management computers 301 and 302 managing these copy pairs.

The example in FIG. 20 shows that two copy pairs belonging to the same logical storage apparatus M1:S1:1—the copy pair where the main storage area is the one having the ID 1 and the sub storage area is the one having the ID 11, and the copy pair where the main storage area is the one having the ID 101 and the sub storage area is the one having the ID 201—are the management targets of the integrated management computer 401. The address of the management computer managing the former copy pair is 10.2.1.1. The address of the management computer managing the latter copy pair is also 10.2.1.1.

Figure 21:
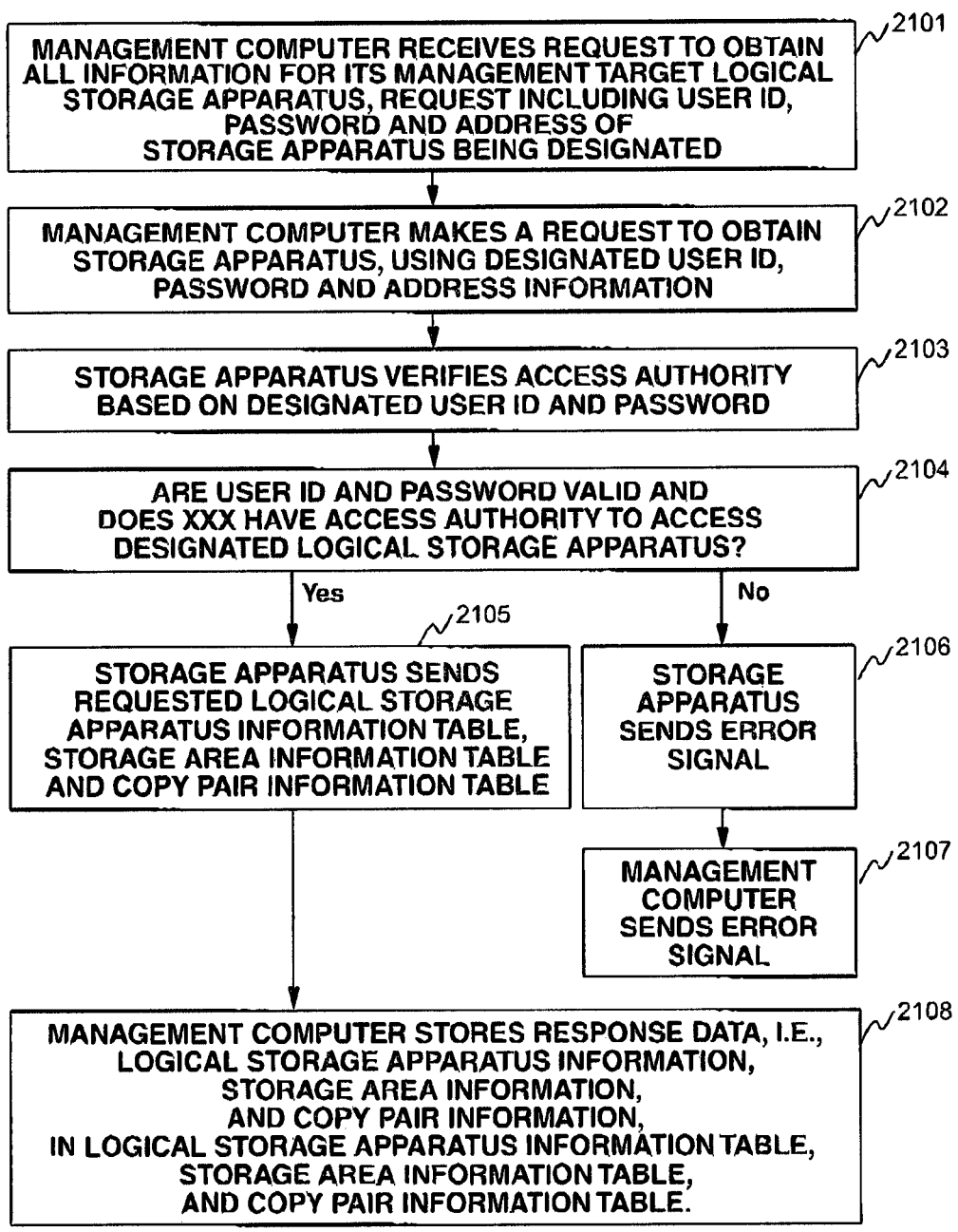
FIG. 21 is a diagram showing the flow of processing according to Embodiment 1 performed so that the management computer can obtain the management information for logical storage apparatuses.

FIG. 21 shows the flow of the processing according to Embodiment 1 performed so that the management computer (301, 302) can obtain the management information for a logical storage apparatus.

When a management computer (301, 302) receives from the integrated management computer 401 a request to obtain all the information for its management target logical storage apparatuses (211-213), the request including the user ID, password and address of the storage apparatus (201, 202) designated (step 2101), it makes a request to obtain the logical storage apparatus information table 244, storage area information table 243 and copy pair information table 246 for the target logical storage apparatuses to the storage apparatus(es) (201, 202), using the designated user ID, password and address information (step 2102).

The storage apparatus (201, 202) verifies the access right based on the designated user ID and password (step 2103), judges whether or not the user ID and password are correct and host computer has the access right) to access the designated logical storage apparatuses 211-213 (step 2104) and, if host computer has the access right, it sends the requested logical storage apparatus information table 244, storage area information table 243 and copy pair information table 246 to the management computer (step 2105). Meanwhile, if host computer does no have the access right, the storage apparatus (201, 202) sends an error signal to the management computer (301, 302) (step 2106) and the management computer (301, 302) sends that error signal to the integrated management computer 401 (step 2107). After step 2105, the management computer (301, 302) stores the information in the response data—the logical storage apparatus information table 244, storage area information table 243, copy pair information table 246—in the logical storage apparatus information table 322, storage area information table 323, and copy pair information table 326 (step 2108).

According to the series of steps in FIG. 21, the management computer (301, 302) obtains and stores the management information for the management target logical storage apparatuses (211-213).

Figure 22:
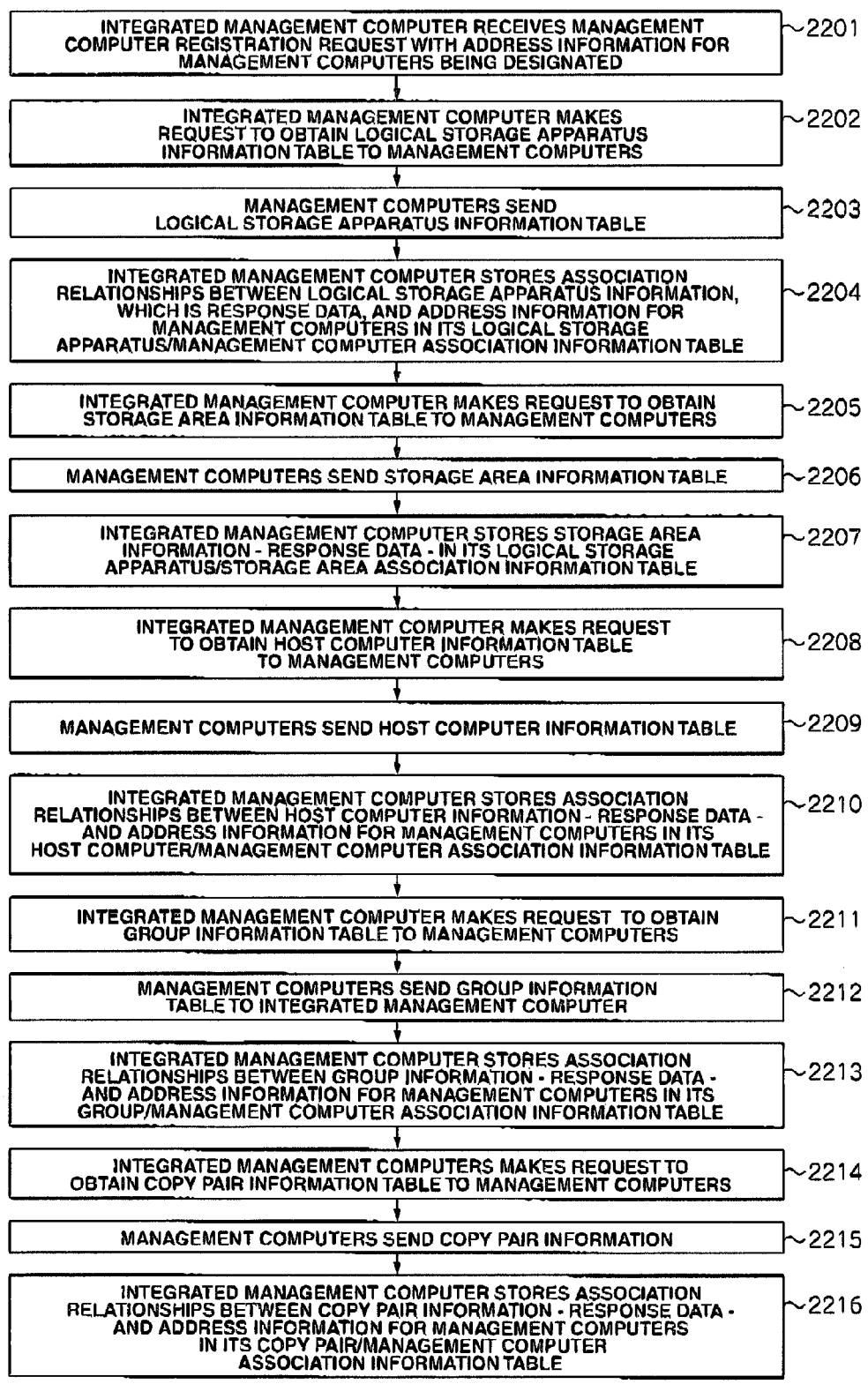
FIG. 22 is a diagram showing the flow of processing according to Embodiment 1 performed so that the integrated management computer can register association relationships between the management computers and their management targets.

FIG. 22 shows the flow of processing according to Embodiment 1 performed so that the integrated management computer can register association relationships between the management computers and their management targets.

When the integrated management computer 401 receives a management computer registration request with the addresses of management computers 301 and 302 being designated (step 2201), it makes a request to obtain the logical storage apparatus information table 322 to the management computers 301 and 302 (step 2202). The management computers 301 and 302 then send the logical storage apparatus information table 322 to the integrated management computer 401 (step 2203). The integrated management computer 401 then stores the association relationships between the apparatus IDs 322-1 included in the logical storage apparatus information table 322, which is the response data, and the address information for the management computers 301 and 302 in the logical storage apparatus/management computer association information table 424 (step 2204). Next, the integrated management computer 401 makes a request to obtain the storage area information table 323 to the management computers 301 and 302 (step 2205).

The management computers 301 and 302 then send the storage area information table 323 to the integrated management computer 401 (step 2206). The integrated management computer 401 refers to the response data, more precisely, the apparatus IDs section 323-1 and storage area IDs section 323-2 included in the storage area information table 323; stores the apparatus IDs stored in the apparatus ID section 323-1 as/in the apparatus IDs section 425-1 in the logical storage apparatus/storage area association information table 425; stores the IDs of the top storage areas, from among the successive storage areas corresponding to the apparatus IDs, stored in the storage area ID section 323-2 as/in the top storage area IDs section 452-2; and stores the IDs of the end storage areas stored in the storage area ID section 3232 as/in the end storage area IDs section 452-3 (step 2207). When two or more successive storage areas belong to the same logical storage apparatus the information for the successive storage areas is stored in the logical storage apparatus/storage area association information table 425. Next, the integrated management computer 401 makes a request to obtain the host computer information table 324 to the management computers 301 and 302 (step 2208). The management computers 301 and 302 then send the host computer information table 324 to the integrated management computer 401 (step 2209).

The integrated management computer 401 stores the association relationships between the host IDs stored in the host ID section 324-1 in the host computer information table 324 and the address information for the management computers 301 and 302 as/in the host computer/management computer association information table 426 (step 2210). Next, the integrated management computer 401 makes a request to obtain the group information table 325 to the management computers 301 and 302 (step 2211). The management computers 301 and 302 then send the group information table 325 to the integrated management computer 401 (step 2212). The integrated management computer 401 then stores the association relationships between the group IDs stored in the group ID section 325-1 in the group information table 325 and the address information for the management computers 301 and 302 as/in the group/management computer association information table 427 (step 2213). The integrated management computer 401 then makes a request to obtain the copy pair information table 326 to the management computers 301 and 302 (step 2214). The management computers 301 and 302 then send the copy pair information 326 to the integrated management computer 401 (step 2215). Then the integrated management computer 401 stores the association relationships between the apparatus IDs stored in the apparatus ID section 326-1, main storage area IDs stored in the main storage area ID section 326-3 and sub storage area IDs stored in the sub storage area ID section 326-4 in the copy pair information table 326 and the address information for the management computers as/in the copy pair/management computer association information table 428 (step 2216).

According to the series of steps in FIG. 22, the integrated management computer 401 obtains and stores the association relationships between the management computers 301 and 302 and their management targets.

Figure 23:
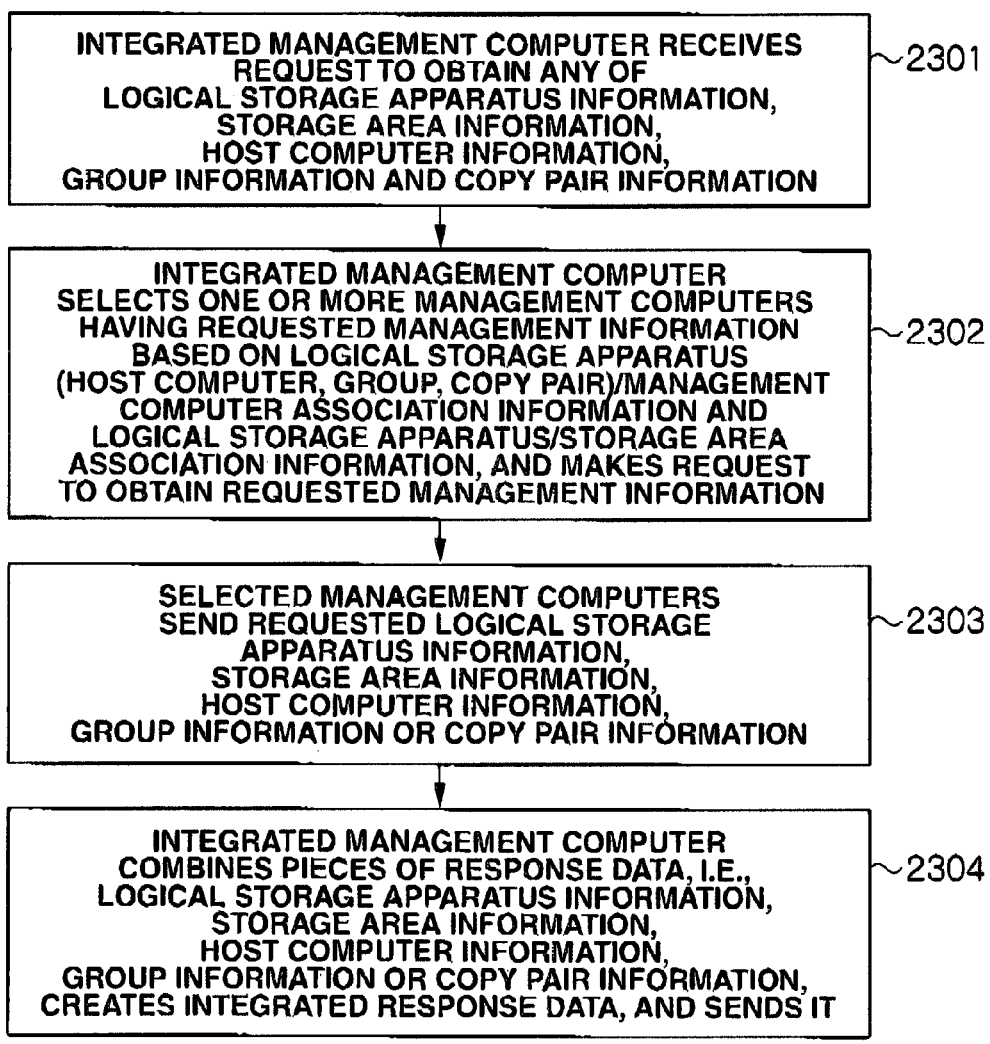
FIG. 23 is a diagram showing the flow of processing according to Embodiment 1 performed so that the integrated management computer can obtain management information for storage apparatuses.

FIG. 23 shows the flow of processing according to Embodiment 1 performed so that the integrated management computer can obtain the management information for logical storage apparatuses.

When the integrated management computer 401 receives from the management terminal 501 a request to obtain any of the logical storage apparatus information, storage area information, host computer information, group information and copy pair information (step 2301), it selects one or more management computers having the requested management information based on the logical storage apparatus (host computer, group, copy pair)/management computer association information and the logical storage apparatus/storage area association information, and makes a request to obtain the requested management information to the management computer(s) (step 2302).

The selected management computers 301 and 302 send the requested logical storage apparatus information, storage area information, host computer information, group information or copy pair information to the integrated management computer 401 (step 2303). The integrated management computer 401 then combines the logical storage apparatus information, storage area information, host computer information, group information or copy pair information sent from the management computers 301 and 302, creates integrated response data and sends it to the management terminal 501 (step 2304).

According to the series of steps in FIG. 23, the integrated management computer 401 obtains the management information using the management computers 301 and 302 managing the management target logical storage apparatuses 211-213, host computers 101-103, groups, and copy pairs.

Figure 24:
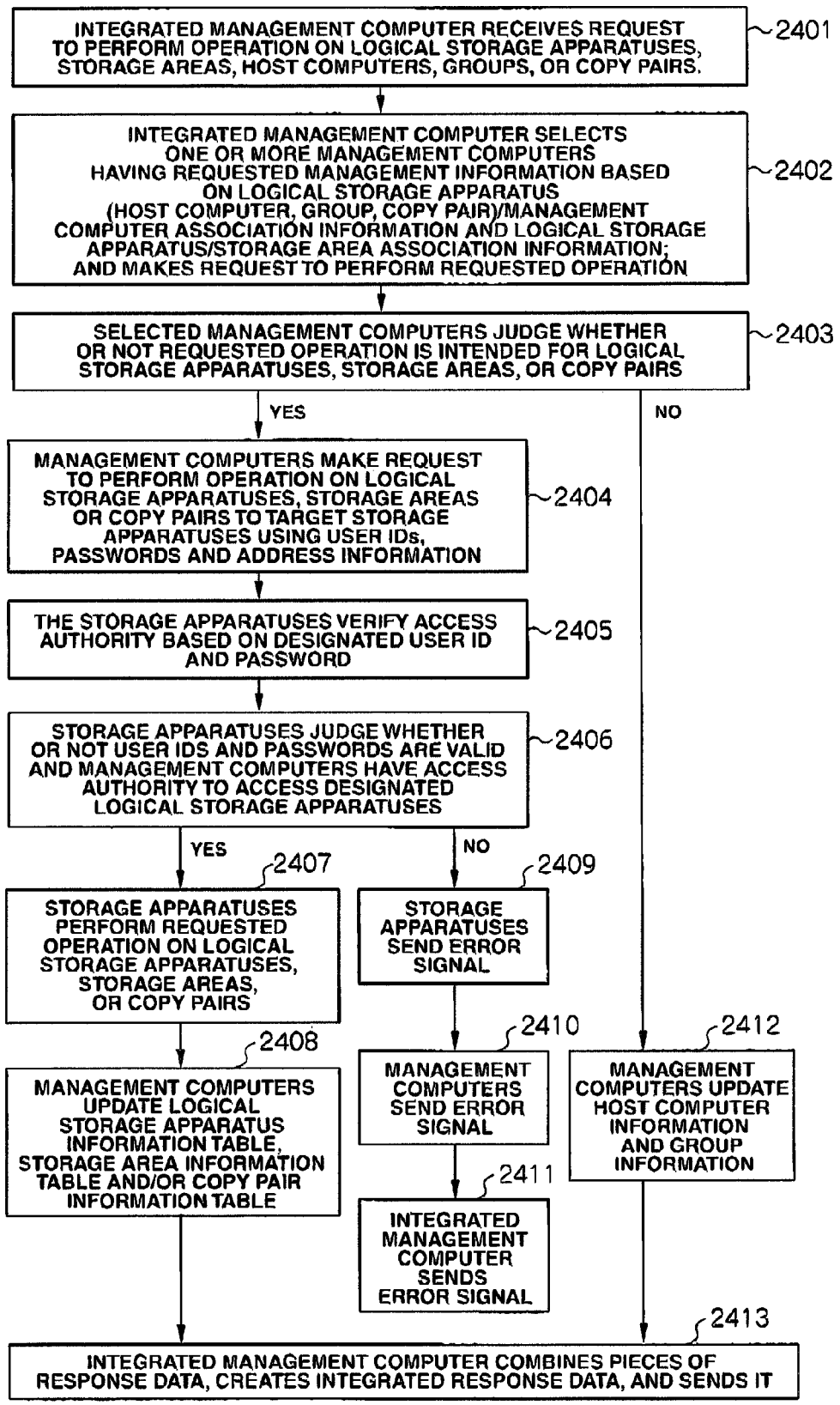
FIG. 24 is a diagram showing the flow of operations according to Embodiment 1 performed by the integrated management computer.

FIG. 24 shows the flow of operations according to Embodiment 1 performed by the integrated management computer 401.

When the integrated management computer 401 receives from the management terminal 501 a request to perform an operation on logical storage apparatuses 211-213, storage areas 271-276, host computers 101-103, groups, or copy pairs (step 2401), it selects one or more management computers having the requested management information, based on the logical storage apparatus (host computer, group, copy pair)/ management computer association information and the logical storage apparatus/storage area association information; and makes a request to perform the requested operation to the management computers 301 and 302 (step 2402). When the requested operation is intended for logical storage apparatuses, the address information for the management computers managing the logical storage apparatuses can be obtained from the logical storage apparatus/management computer association information table 424. When the request operation is intended for host computers 101-103, groups or copy pairs, the address information for the management computers can be obtained from the host computer/management computer association information table 426, group/management computer association information table 427, or copy pair/ management computer association information table 428, respectively.

If the requested operation is intended for storage areas, the integrated management computer 401 specifies logical storage apparatuses 211-213 based on the logical storage apparatus/storage area association information table 425; refers to the logical storage apparatus/management computer association information table 424; and obtains the address information for the management computer(s) (301, 302) exercising the management of that storage area.

The selected management computers judge whether or not the requested operation is intended for logical storage apparatuses, storage areas, or copy pairs (step 2403) and, if it is intended for any of them, the process proceeds to step 2404, but if the request is not intended for any of them, the process proceeds to step 2412. The management computers 301 and 302 then make a request to perform operations on the logical storage apparatuses 211-213, storage areas or copy pairs to target storage apparatuses) using registered the users ID, passwords, and address information (step 2404). The storage apparatuses 201 and 202 then verify the access right based on the designated user ID and password (step 2405).

The storage apparatuses 201 and 202 then judge whether or not the user IDs and passwords are valid and the access right to access the designated logical storage apparatuses (step 2406) could be confirmed, and if they have the access right, the process proceeds to step 2407, whereas if they do not have the access right, the process proceeds to step 2409. When the judgment in step 2406 is positive, the storage apparatuses 201 and 202 perform the requested operation on the logical storage apparatuses, storage areas, or copy pairs (step 2407).

The management computers 301 and 302 update the logical storage apparatus information table 322, storage area information table 323 and/or copy pair information table 326 if any changes have been made, and the process proceeds to step 2413 (step 2408). If the management computers do not have the access right, the storage apparatuses 201 and 202 send an error signal to the management computers 301 and 302 (step 2409). The management computers 301 and 302 send this error signal to the integrated management computer 401 (step 2410). The integrated management computer 401 then sends this error signal to the management terminal 501 (step 2411). If the requested operation is not intended for logical storage apparatuses, storage areas or copy pairs, the management computers 301 and 302 update the host computer information and group information (step 2412). The integrated management computer 401 combines the response data from the management computers 301 and 302; creates integrated response data; and sends it to the management terminal 501 (step 2413).

According to the series of steps in FIG. 24, the integrated management computer 401 can perform operations on the management target logical storage apparatuses 211-213, host computers 101-103, groups and copy pairs by using the management computers 301 and 302 that manage them.

Embodiment 2

Figure 25:
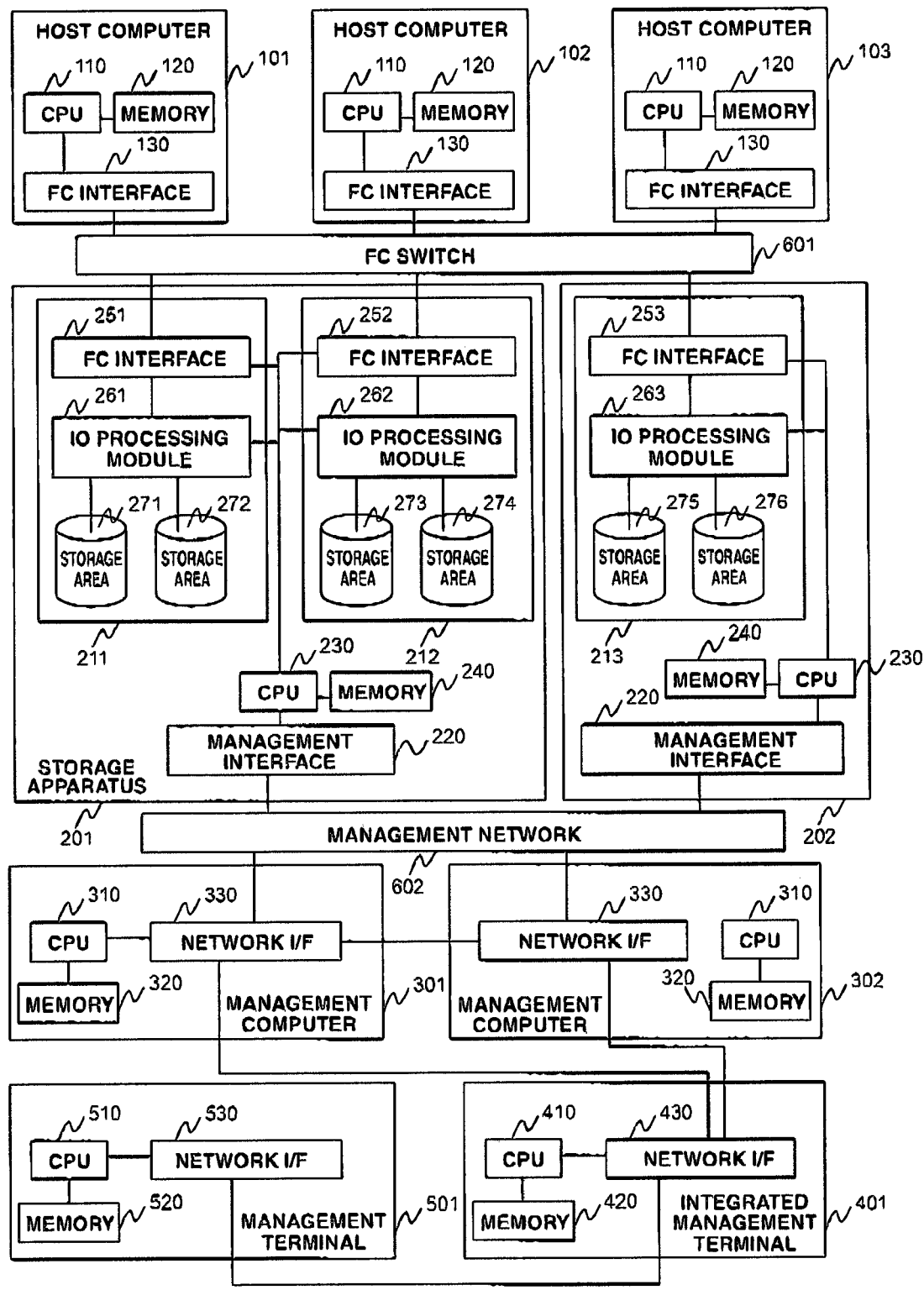
FIG. 25 is a diagram showing a system structure according to Embodiment 2.

Embodiment 2 of this invention is explained below with reference to the drawings. FIG. 25 shows the system structure according to Embodiment 2. As it is shown in the drawing, the system structure in this embodiment is almost the same as that in Embodiment 1 but is different in that the management computers 301 and 302 are connected to each other.

The management computers 301 and 302 are connected to each other via their own network I/Fs 330. The number of programs stored in the memory 320 in each management computer (301, 302) in FIG. 25 and the number of programs stored in the memory 420 in the integrated management computer 401 are larger than those in Embodiment 1.

Figure 26:
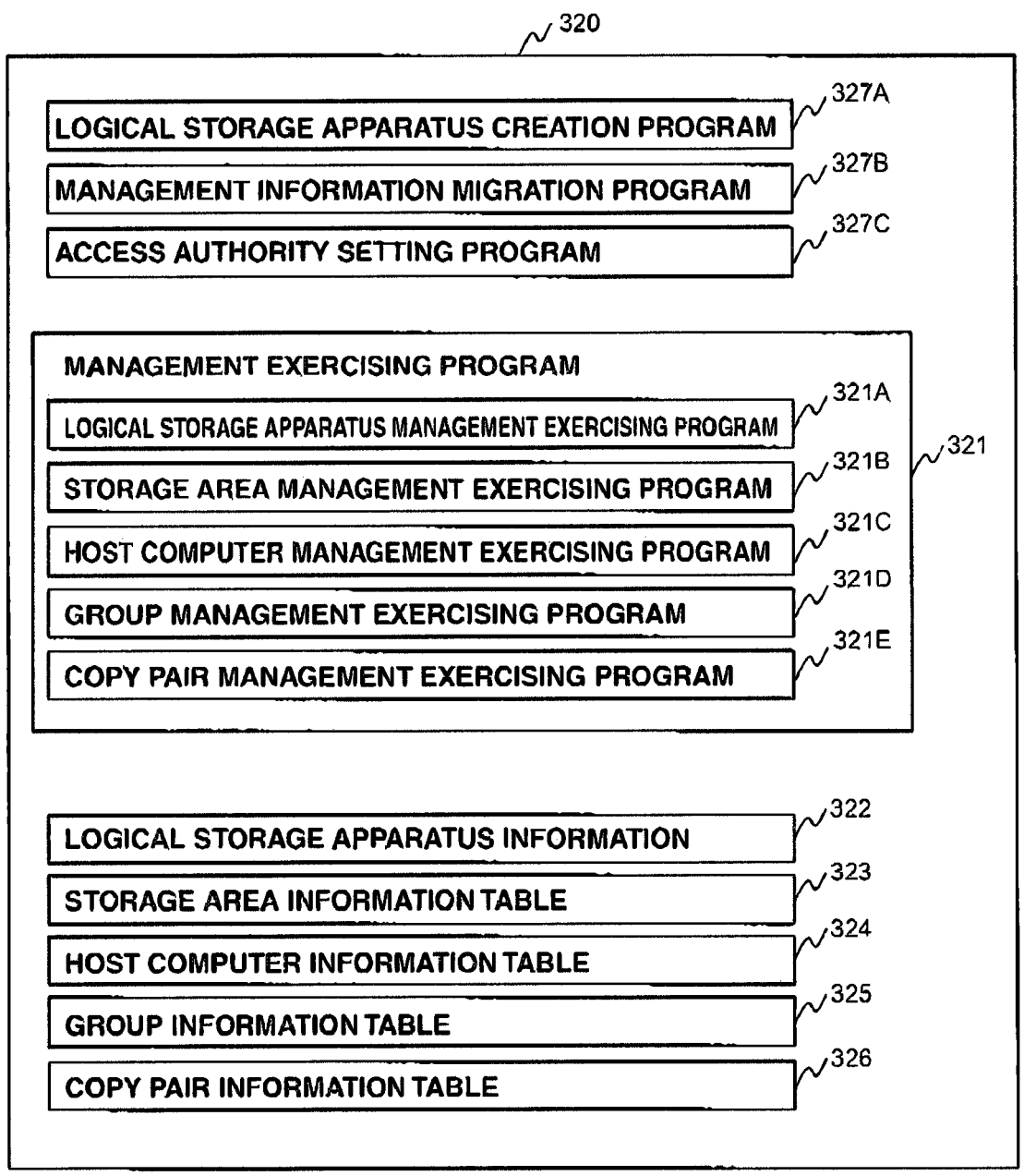
FIG. 26 is a diagram showing an example of programs and data stored in memory in a management computer according to Embodiment 2.

FIG. 26 shows an example of the programs and data stored in the memory 320 in each management computer (301, 302) according to Embodiment 2. The management computer (301, 302) stores in its memory 320, in addition to the programs and data in Embodiment 1: a logical storage apparatus creation program 327A for creating logical storage apparatuses in the storage apparatuses 201 and 202 or in the logical storage apparatuses 211-213, which are both the management targets for the management computer; a management information migration program 327B for migrating the management information between the management computers; and access right setting program 327C for setting, when migrating the management information, access right to a migration destination management computer so that it can access the access target storage apparatuses 201 and 202.

The logical storage apparatus creation program 327A, management information migration program 327B, and access right setting program 327C are stored on a non-volatile recording medium, such as a magnetic disk, in the management computer (301, 302) and loaded into the memory 320 and run by the CPU 310 when the management computer (301, 302) is activated. These programs may alternatively be stored on a recording medium (e.g., non-volatile memory, a CD-ROM, or a floppy (registered trademark) disk) other than a magnetic disk. These programs are loaded from the recording medium into the management computer (301, 302) or they may be accessed via the network and loaded into the management computer (301, 302).

Figure 27:
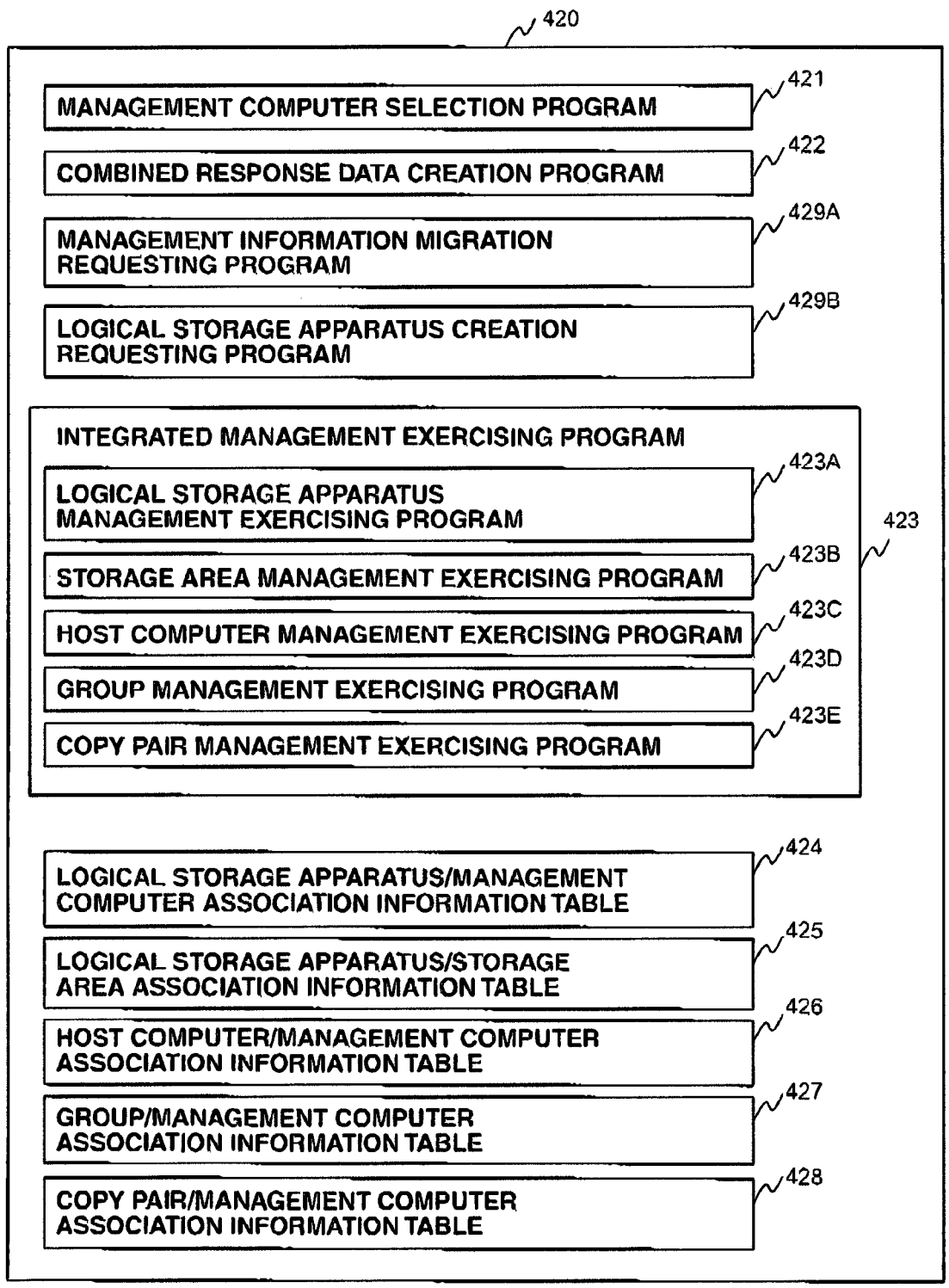
FIG. 27 is a diagram showing an example of programs and data stored in memory in an integrated management computer according to Embodiment 2.

FIG. 27 shows an example of the programs and data stored in the memory 420 in the integrated management computer 401 according to Embodiment 2. The integrated management computer 401 stores in its memory 420, in addition to the programs and data in Embodiment 1; a management information migration requesting program 429A for requesting the migration of the management information between the management computers 301 and 302; and a logical storage apparatus creation requesting program 429B for requesting the creation of a logical storage apparatus in the storage apparatuses 201 and 202 or in the logical storage apparatuses 211-213, both are the management targets for the management computers 301 and 302. The management information migration requesting program 429A and logical storage apparatus creation requesting program 429B are stored on a nonvolatile recording medium, such as a magnetic disk, in the integrated management computer 401 and loaded into the memory 420 and run by the CPU 410 when the integrated management computer 401 is activated. These programs may alternatively be stored on a recording medium (e.g., nonvolatile memory, a CD-ROM, or a floppy (registered trademark) disk) other than a magnetic disk. These programs are loaded from the recording medium into the integrated management computer 401 or they may be accessed via the network and loaded into the integrated management computer 401.

Figure 28:
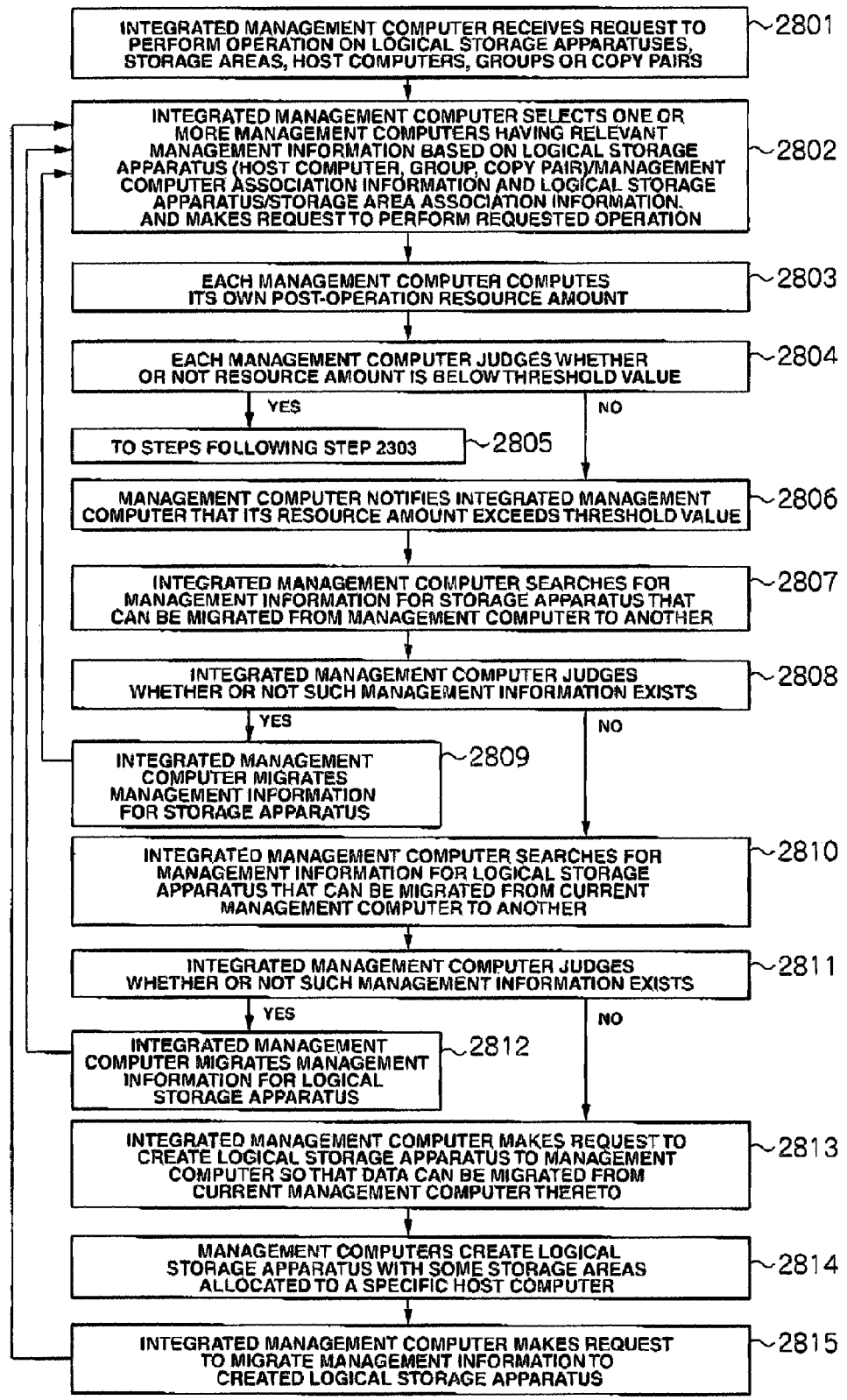
FIG. 28 is a diagram showing the flow of operations according to Embodiment 2 performed by the integrated management computer.

FIG. 28 shows the flow of operations according to Embodiment 2 performed by the integrated management computer 401. When the integrated management computer 401 receives a request to perform an operation on logical storage apparatuses 211-213, storage areas, host computers 101-103, groups or copy pairs (step 2801), it selects one or more management computers having the relevant management information based on the logical storage apparatus (host computer, group, copy pair)/management computer association information and the logical storage apparatus/storage area association information; and makes a request to perform the requested operation to the management computers 301 and 302 (step 2802).

Each management computer 301, 302 computes its own post-operation resource amount (step 2803), judges whether or not the resource amount is below a threshold value (step 2804), and if the resource amount is below the threshold value, it proceeds to step 2805 and executes step 2403 explained in FIG. 24. If the resource amount is not below the threshold value, it proceeds to step 2806.

It is assumed that either of the management computers 301 and 302 notifies the integrated management computer 401 that its resource amount exceeds the threshold value (step 2806). The integrated management computer 401 searches for the migratable management information for storage apparatus(es) (201, 202) that can be migrated from the management computer to another (step 2807), judges whether or not such management information exists (step 2808) and, if it does, process proceeds to step 2809, but if it doesn't, it proceeds to step 2810 (step 2810).

Next, the management computer migrates the management information for the storage apparatus(es) (201, 202) to another management computer (step 2809), and the process proceeds to step 2802. If there is no migratable management information for the storage apparatuses, the integrated management computer 401 searches for the migratable management information for logical storage apparatus(es) that can be migrated from the current management computer to another (step 2810, judges whether or not such management information exists (step 2811 and, if it does, the process proceeds to step 2812 where the integrated management computer 401 migrates the management information for the logical storage apparatus(es) and returns to step 2802, but if it doesn't, the process proceeds to step 2813 where the integrated management computer 401 makes a request to create a logical storage apparatus to the management computer 301 and 302 so that the data can be migrated there. The management computers 301 and 302 then create a logical storage apparatus with some storage areas allocated to a specific host computer (step 2814). The integrated management computer 401 then makes a request to migrate the management information to the created logical storage apparatus (step 2815) and the process returns to step 2802.

According to the series of steps in FIG. 28, the management information can be migrated between the management computers 301 and 302, and the integrated management computer 401 can perform operations for the logical storage apparatuses 211-213, host computers 101-103, groups and copy pairs by means of the management computers 301 and 302 that manage them.

Figure 29:
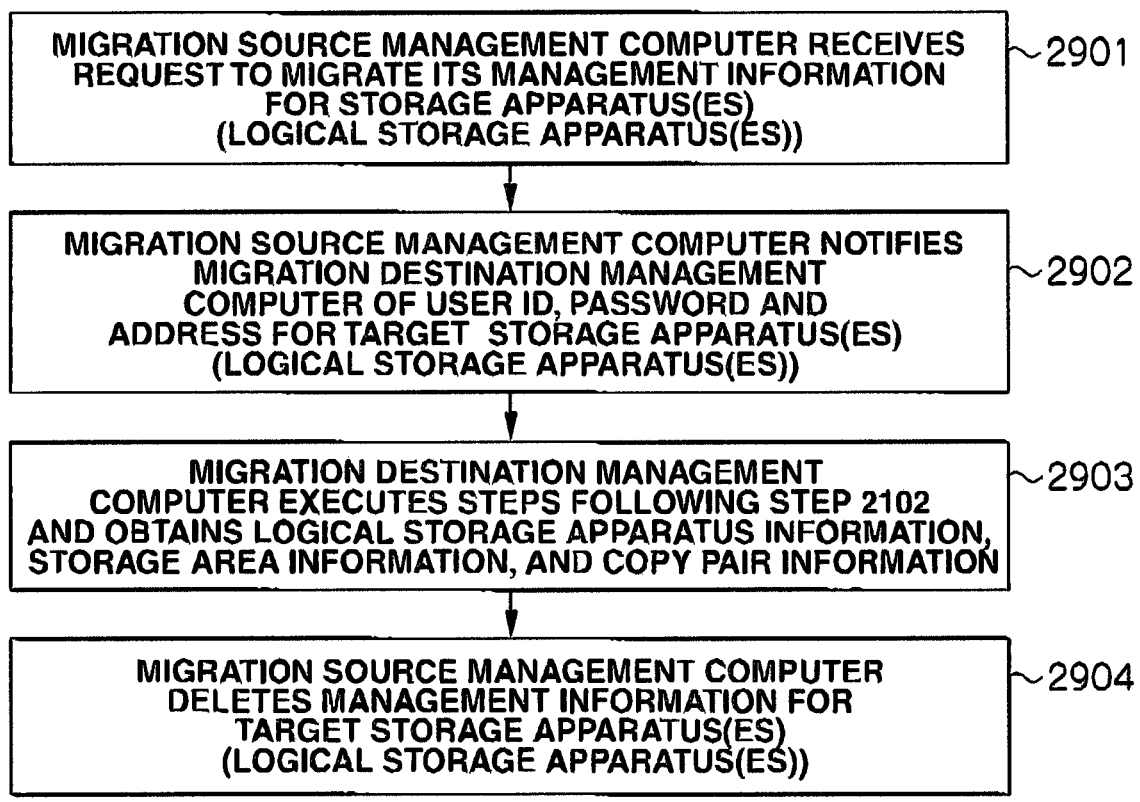
FIG. 29 is a diagram showing the flow of processing according to Embodiment 2 performed by the management computers to migrate management information.

FIG. 29 shows the flow of processing according to Embodiment 2 performed by the management computers to migrate management information. First, a migration source management computer receives a request to migrate its management information for storage apparatus(es) (logical storage apparatus(es)) to another management computer (step 2901). The migration source management computer notifies a migration destination management computer of the user ID, password and address for the relevant storage apparatus(es) (logical storage apparatus(es)) (step 2902). The migration destination management computer executes the steps following step 2102 and obtains the logical storage apparatus information, storage area information, and copy pair information (step 2903). The migration source management computer then deletes the management information for the storage apparatus (es) (logical storage apparatus(es)) (step 2904).

According to the series of steps in FIG. 29, the management information can be migrated between the management computers 301 and 302 and the migration destination management computer can obtain the access right for the relevant logical storage apparatus.

Figure 30:
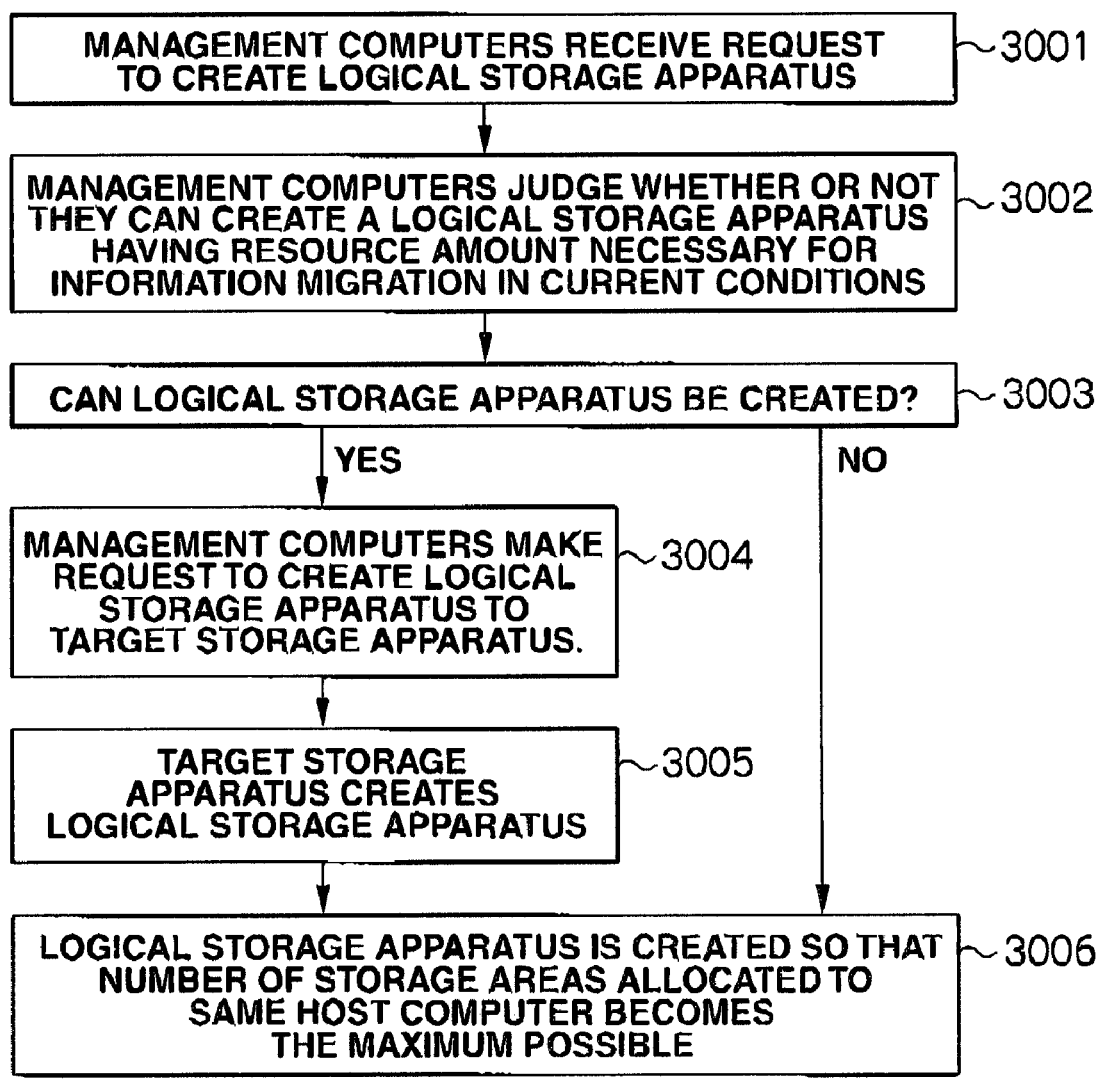
FIG. 30 is a diagram showing the flow of operations according to Embodiment 2 performed so that the management computers create a logical storage apparatus.

FIG. 30 shows the flow of operations according to Embodiment 2 performed so that the management computers create a logical storage apparatus. When the management computers 301 and 302 receive a request to create a logical storage apparatus (step 3001), they judge whether or not they can create a logical storage apparatus having the resource amount necessary for information migration in the current conditions (step 3002), if they can (step 3003), the process proceeds to step 3004, but if they cannot, the process proceeds to step 3006. The management computers 301 and 302 make a request to create a logical storage apparatus to a target storage apparatus (step 3004). The target storage apparatus creates a logical storage apparatus (211-213) (step 3005). The logical storage apparatus is created so that the number of storage areas allocated to the same host computer becomes the maximum During the creation of a logical storage apparatus, if the storage areas allocated to the same host computer are not included in the boundary of the logical storage apparatus, the data included in the storage areas may be migrated so that it can be included in the boundary of the logical storage apparatus)

According to the series of steps in FIG. 30, the amount of the management information for the storage apparatuses and the logical storage apparatuses to be migrated between the management computers can be controlled and storage areas can be allocated to the host computers efficiently.

According to this invention, storage apparatus management software compatible with the integration of SANs or the expansion of the scale of a SAN can be provided.

What is claimed is:

1. A management system for integrating management of a plurality of storage apparatuses connected via a communication network, the management system comprising:
    a plurality of management computers including a first management computer and a second management computer,
    wherein each of the plurality of management computers comprises a first processor and a first storage area, and manages some of a plurality of logical storage apparatuses included in some of the plurality of storage apparatuses, and
    wherein each of the plurality of storage apparatuses includes a second processor and a second storage area which forms at least one of the plurality of logical storage apparatuses;
    an integrated management computer which is connected via communication paths to the plurality of management computers and manages the plurality of management computers,
    wherein the integrated management computer collects, from the first management computer, first management information which indicates a first logical storage apparatus which is managed by the first management computer, and collects, from the second management computer, second management information which indicates a second logical storage apparatus which is managed by the second management computer,
    wherein the integrated management computer stores the collected first management information and the collected second management information as integrated management information,
    wherein when the integrated management computer receives an operation request for the first logical storage apparatus from a management terminal, the integrated management computer selects, by referring to the integrated management information, the first management computer which manages the first logical storage apparatus corresponding to the operation request, and sends the operation request to the selected first management computer,
    wherein the first management computer, which receives the operation request from the integrated management computer, calculates a post requested operation storage capacity of the first logical storage apparatus, which is managed by the selected first management computer, and
    wherein if the calculated storage capacity exceeds a threshold value, the first management computer notifies the integrated management computer that the post requested operation storage capacity exceeds a threshold value, and the integrated management computer instructs the second management computer to send the second management information to the first management computer so that the first management computer can manage the second logical storage apparatus,
    wherein each of the plurality of management computers comprises:
        a logical storage apparatus creation unit that creates, inside the storage apparatus, a logical storage apparatus composed of successive storage areas and capable of being handled as an independent storage apparatus;
        a management information migration unit that migrates the integrated management information including device information, which is included in the logical storage apparatus, to a migration destination management computer; and
        an access right setting unit that sets, when migrating the integrated management information, access right to access the logical storage apparatus for the migration destination management computer,
    wherein, the integrated management computer sets one of the selected plurality of management computers as a migration destination management computer and sets another selected management computer as a migration source management computer, and
    wherein the integrated management computer comprises:
        a management information migration requesting unit that makes a request to migrate management information to the migration destination management computer from among the selected management computers; and
        a logical storage apparatus creation requesting unit that makes a request to create a logical storage apparatus in the storage apparatus to the migration destination management computer.

2. The management system according to claim 1, wherein the integrated management computer selects, based on integrated management information including association relationships between storage areas and the storage apparatuses including these storage areas, one or more of the plurality of management computers to which the ability to manage the storage areas has been provided.

3. The management system according to claim 1, wherein the integrated management computer selects, based on integrated management information including association relationships between host computers connected to the communication network and having storage areas allocated and the management computers whose management targets are these host computers, one or more of the plurality of management computers to which the ability to manage the storage areas allocated to the host computers has been provided.

4. The management system according to claim 1, wherein the integrated management computer selects, based on integrated management information including association relationships between the groups of host computers connected to the communication network and having resources provided by the storage apparatuses or storage areas allocated and the management computers whose management targets are those groups, one or more of the plurality of management computers to which the ability to manage the groups has been provided.

5. The management system according to claim 1, wherein the integrated management computer selects, based on integrated management information including association relationships between the information about copying between storage areas and the storage apparatuses having that copy information, one or more of the plurality of management computers to which the ability to manage the copy information has been provided.

6. A method for integrating management of storage apparatuses comprising:

managing, by each of a plurality of management computers, some of a plurality of logical storage apparatuses included in some of a plurality of storage apparatuses connected via a communication network, each of the plurality of management computers comprising a first processor and a first storage area, wherein the plurality of management computers include a first management computer and a second management computer, and wherein each of the plurality of storage apparatuses includes a second processor and a second storage area which forms at least one of the plurality of logical storage apparatuses;

managing, by an integrated management computer, the plurality of management computers, wherein the integrated management computer is connected via communication paths to the plurality of management computers;

collecting, from the first management computer, first management information which indicates a first logical storage apparatus which is managed by the first management computer;

collecting, from the second management computer, second management information which indicates a second logical storage apparatus which is managed by the second management computer;

storing, by the integrated management computer, the collected first management information and the collected second management information as integrated management information;

when the integrated management computer receives an operation request for the first logical storage apparatus from a management terminal, selecting, by referring to the integrated management information, the first management computer which manages the first logical storage apparatus corresponding to the operation request, and sending the operation request to the selected first management computer;

calculating, by the first management computer, which receives the operation request from the integrated management computer, a post requested operation storage capacity of the first logical storage apparatus, which is managed by the selected first management computer;

if the calculated storage capacity exceeds a threshold value, notifying, by the first management computer, the integrated management computer that the post requested operation storage capacity exceeds a threshold value, and instructing, by the integrated management computer, the second management computer to send the second management information to the first management computer so that the first management computer can manage the second logical storage apparatus, wherein each of the management computers comprises a logical storage apparatus creation unit; a management information migration unit, and an access right setting unit;

creating, by the logical storage apparatus creation unit, and inside the storage apparatus, a logical storage apparatus composed of successive storage areas and capable of being handled as an independent storage apparatus;

migrating, by the management information migration unit, the integrated management information including device information, which is included in the logical storage apparatus, to a migration destination management computer; and setting, by the access right setting unit, when migrating the integrated management information, access right to access the logical storage apparatus for the migration destination management computer, wherein said first step further comprises:

setting one of the selected management computers as a migration destination management computer and setting another selected management computer as a migration source management computer;

making a request to migrate integrated management information to the migration destination management computer from among the selected management computers; and making a request to create a logical storage apparatus in any of the storage apparatuses to the migration destination management computer.

7. The storage apparatus management method according to claim 6, further comprising:

selecting, based on integrated management information including association relationships between storage areas and the storage apparatuses including these storage areas, one or more management computers to which the ability to manage the storage areas has been provided.

8. The storage apparatus management method according to claim 6, further comprising:

selecting, based on integrated management information including association relationships between host computers connected to the communication network and having storage areas allocated and the management computers whose management targets are the host computers, one or more management computers to which the ability to manage the storage areas allocated to the host computers has been provided.

9. The storage apparatus management method according to claim 6, further comprising:

selecting, based on integrated management information including association relationships between the groups of host computers connected to the communication network and having resources provided by the storage apparatuses or storage areas allocated and the management computers whose management targets are those groups, one or more management computers to which the ability to manage the groups has been provided.

10. The storage apparatus management method according to claim 6, wherein the first step further comprises:

selecting, based on integrated management information including association relationships between the information about copying between the storage areas and the storage apparatuses having that copy information, one or more management computers to which the ability to manage the copy information has been provided.

11. A computer system for integrating management of a plurality of storage apparatuses connected via a communication network, the computer system comprising:

a host computer connected to a communication network;

a plurality of management computers including a first management computer and a second management computer, wherein each of the plurality of management computers comprises a first processor and a first storage area, and manages some of a plurality of logical storage apparatuses included in some of a plurality of storage apparatuses connected via a communication network, and wherein each of the plurality of storage apparatuses includes a second processor and a second storage area which forms at least one of the plurality of logical storage apparatuses; and an integrated management computer which is connected to the plurality of management computers via communication paths and manages the plurality of management computers, wherein the integrated management computer collects, from the first management computer, first management information which indicates a first logical storage apparatus which is managed by the first management computer, and collects, from the second management computer, second management information which indicates a second logical storage apparatus which is managed by the second management computer, wherein the integrated management computer stores the collected first management information and the collected second management information as integrated management information, wherein when the integrated management computer receives an operation request for the first logical storage apparatus from a management terminal, the integrated management computer selects, by referring to the integrated management information, the first management computer which manages the first logical storage apparatus corresponding to the operation request, and sends the operation request to the selected first management computer, wherein the first management computer, which receives the operation request from the integrated management computer, calculates a post requested operation storage capacity of the first logical storage apparatus, which is managed by the selected first management computer, and wherein if the calculated storage capacity exceeds a threshold value, the first management computer notifies the integrated management computer that the post requested operation storage capacity exceeds a threshold value, and the integrated management computer instructs the second management computer to send the second management information to the first management computer so that the first management computer can manage the second logical storage apparatus, wherein each of the management computers comprises:
  a logical storage apparatus creation unit that creates, inside the storage apparatuses, a logical storage apparatus composed of successive storage areas and capable of being handled as an independent storage apparatus;
  a management information migration unit that migrates the integrated management information including device information, which is included in the logical storage apparatus, to a migration destination management computer; and
  an access right setting unit that sets, when migrating the integrated management information, access right to access the logical storage apparatus for the migration destination management computer, wherein, the integrated management computer sets one of the selected management computers as a migration destination management computer and sets another selected management computer as a migration source management computer, and wherein the integrated management computer comprises:
  a management information migration requesting unit that makes a request to migrate integrated management information to the migration destination management computer from among the selected management computers; and
  a logical storage apparatus creation requesting unit that makes a request to create a logical storage apparatus in any of the storage apparatuses to the migration destination management computer.

12. The computer system according to claim 11, wherein the integrated management computer selects, based on integrated management information including association relationships between storage areas and the storage apparatuses including these storage areas, one or more of the plurality of management computers to which the ability to manage the storage areas has been provided.

13. The computer system according to claim 11, wherein the integrated management computer selects, based on integrated management information including association relationships between host computers connected to the communication network and having storage areas allocated and the management computers whose management targets are the host computers, one or more of the plurality of management computers to which the ability to manage the storage areas allocated to the host computers has been provided.

14. The computer system according to claim 11, wherein the integrated management computer selects, based on integrated management information including association relationships between the groups of host computers connected to the communication network and having resources provided by the storage apparatuses or storage areas allocated and the management computers whose management targets are those groups, one or more of the plurality of management computers to which the ability to manage the groups has been provided.

15. The computer system according to claim 11, wherein the integrated management computer selects, based on integrated management information including association relationships between the information about copying between the storage areas and the storage apparatuses having that copy information, one or more of the plurality of management computers to which the ability to manage the copy information has been provided.

* * * * *